(12) United States Patent  
Gunawan et al.

(10) Patent No.: US 11,148,049 B2  
(45) Date of Patent: Oct. 19, 2021

(54) DATA PROVIDING METHODS, DATA PROVIDING SYSTEMS, AND COMPUTER-READABLE MEDIA

(71) Applicant: RAZER (ASIA-PACIFIC) PTE. LTD., Singapore (SG)

(72) Inventors: Henky Jatmiko Gunawan, Singapore (SG); Hung Wei Goh, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 16/313,354

(22) PCT Filed: Jun. 29, 2016

(86) PCT No.: PCT/SG2016/050303  
§ 371 (c)(1),  
(2) Date: Dec. 26, 2018

(87) PCT Pub. No.: WO2018/004454  
PCT Pub. Date: Jan. 4, 2018

(65) Prior Publication Data  
US 2020/0078676 A1 Mar. 12, 2020

(51) Int. Cl.
| | |
|---|---|
| A63F 13/323 | (2014.01) |
| A63F 13/5375 | (2014.01) |
| A63F 13/77 | (2014.01) |
| A63F 13/79 | (2014.01) |
| A63F 13/87 | (2014.01) |

(52) U.S. Cl.  
CPC ........ *A63F 13/323* (2014.09); *A63F 13/5375* (2014.09); *A63F 13/77* (2014.09); *A63F 13/79* (2014.09); *A63F 13/87* (2014.09)

(58) Field of Classification Search  
CPC .... A63F 13/323; A63F 13/5375; A63F 13/77; A63F 13/79  
See application file for complete search history.

(56) References Cited

U.S. PATENT DOCUMENTS

| | | |
|---|---|---|
| 6,931,290 B2 | 8/2005 | Forest |
| 7,993,291 B2 | 8/2011 | Karkanias et al. |
| 8,100,756 B2 | 1/2012 | O'Rourke et al. |

(Continued)

FOREIGN PATENT DOCUMENTS

| | | |
|---|---|---|
| CN | 101329674 A | 12/2008 |
| CN | 103620544 A | 3/2014 |

(Continued)

OTHER PUBLICATIONS

International Search Report and Written Opinion, dated Feb. 17, 2017, for the corresponding International Application No. PCT/SG2016/050303 in 10 pages.

(Continued)

*Primary Examiner* — William H McCulloch, Jr.  
*Assistant Examiner* — Ankit B Doshi  
(74) *Attorney, Agent, or Firm* — Polsinelli PC

(57) ABSTRACT

According to various embodiments, a data providing method may be provided. The data providing method may include: determining a hypothetical question of a user using an application program; determining an answer to the hypothetical question; and providing the answer in the form of a hint to the user.

20 Claims, 18 Drawing Sheets

(56) References Cited

U.S. PATENT DOCUMENTS

| | | |
|---|---|---|
| 8,279,051 B2 | 10/2012 | Khan |
| 8,771,074 B2 | 7/2014 | Walker et al. |
| 9,959,008 B2 | 5/2018 | Tan et al. |
| 2001/0009867 A1 | 7/2001 | Sakaguchi et al. |
| 2007/0135202 A1 | 6/2007 | Linard et al. |
| 2008/0195238 A1 | 8/2008 | Takahashi et al. |
| 2008/0261701 A1 | 10/2008 | Lewin et al. |
| 2008/0280662 A1 | 11/2008 | Matwin et al. |
| 2009/0091087 A1* | 4/2009 | Wasmund ............... A63F 9/18 273/430 |
| 2009/0124380 A1* | 5/2009 | Beeman ............... A63F 13/10 463/31 |
| 2009/0137298 A1 | 5/2009 | Bedingfield, Sr. et al. |
| 2010/0035689 A1 | 2/2010 | Altshuler et al. |
| 2010/0035726 A1 | 2/2010 | Fisher et al. |
| 2013/0005471 A1 | 1/2013 | Chung et al. |
| 2013/0139068 A1 | 5/2013 | Bowring |
| 2014/0143687 A1 | 5/2014 | Tan et al. |
| 2015/0065220 A1 | 3/2015 | Nabi et al. |
| 2015/0140526 A1 | 5/2015 | Marino et al. |
| 2015/0297981 A1* | 10/2015 | Kim ............... G06Q 50/10 463/9 |
| 2016/0089608 A1 | 3/2016 | Deng et al. |

FOREIGN PATENT DOCUMENTS

| | | |
|---|---|---|
| CN | 104298427 A | 1/2015 |
| CN | 104850539 A | 8/2015 |
| EP | 1393786 A1 | 3/2004 |
| TW | 201611877 A | 4/2016 |

OTHER PUBLICATIONS

Extended European Search Report dated Jun. 14, 2019, 8 pages, for the corresponding European Patent Application No. 16907485.3.

Office Action dated Jun. 9, 2021 in 8 pages (including English translation), for the corresponding Taiwanese Patent Application No. 106111714.

Office Action (including English Translation) dated Jun. 23, 2021, for the corresponding Chinese Application No. 201680087345.2 in 12 total pages.

* cited by examiner

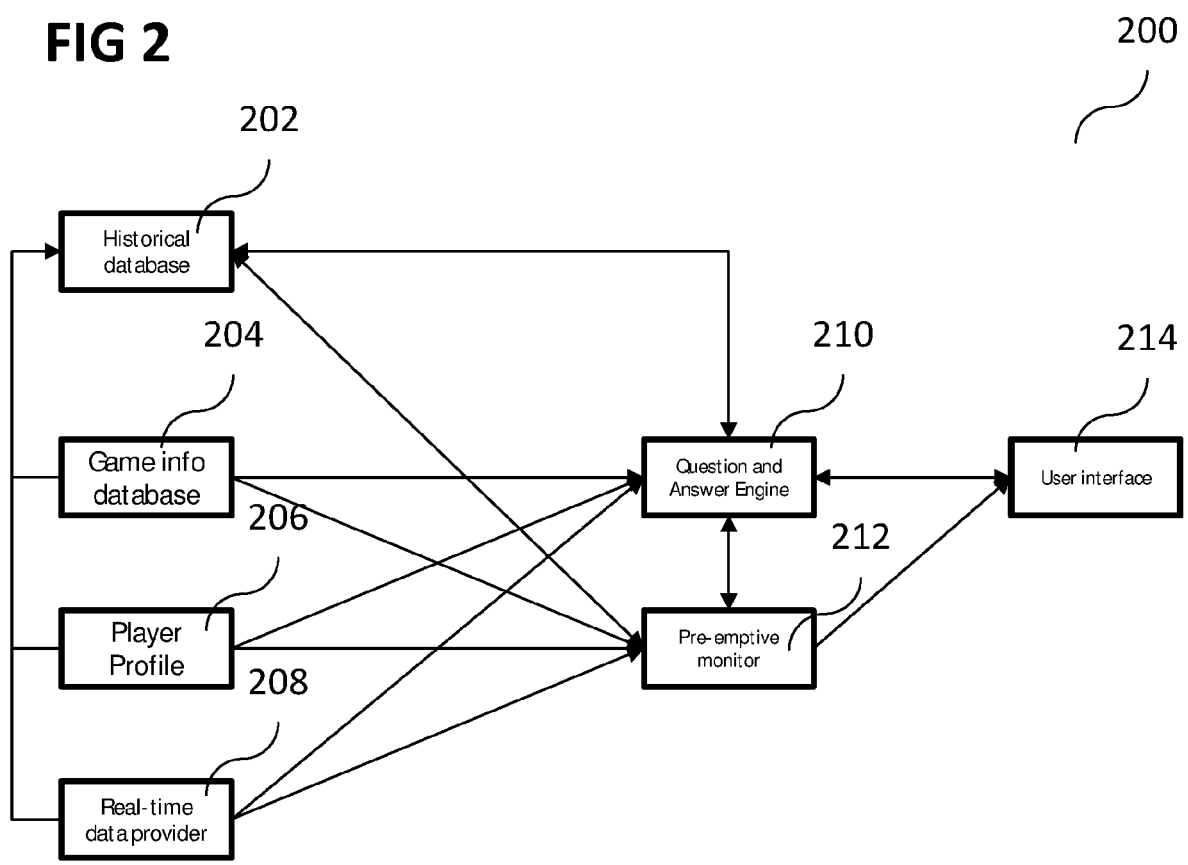

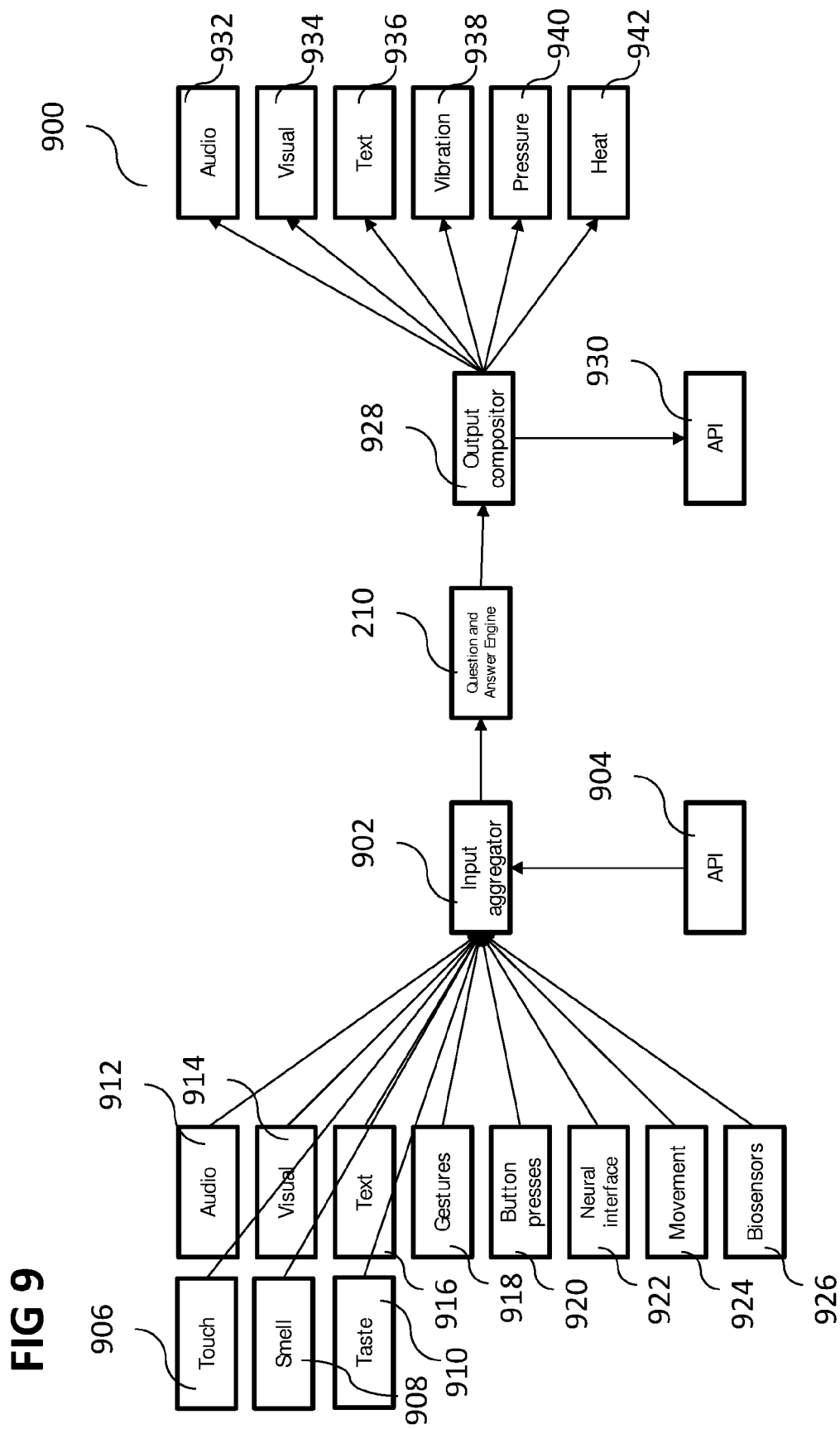

DATA PROVIDING METHODS, DATA PROVIDING SYSTEMS, AND COMPUTER-READABLE MEDIA

TECHNICAL FIELD

Various embodiments generally relate to data providing methods, data providing systems, and computer-readable media.

BACKGROUND

Gamers may get stuck during game play and may be forced to pause game play in order to research on how to proceed. Thus, there may be a need to facilitate game play for gamers.

SUMMARY OF THE INVENTION

According to various embodiments, a data providing method may be provided. The data providing method may include: determining a hypothetical question of a user using an application program; determining an answer to the hypothetical question; and providing the answer in the form of a hint to the user.

According to various embodiments, a data providing system may be provided. The data providing system may include: a question determination circuit configured to determine a hypothetical question of a user using an application program; an answer determination circuit configured to determine an answer to the hypothetical question; and a pre-emptive monitor circuit configured to provide the answer in the form of a hint to the user.

According to various embodiments, a computer-readable medium may be provided. The computer-readable medium may include instructions which, when executed by a computer, make the computer perform a data providing method. The data providing method may include: determining a hypothetical question of a user using an application program; determining an answer to the hypothetical question; and providing the answer in the form of a hint to the user.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which:

FIG. 2 shows an illustration of an overall mechanism of a system according to various embodiments;

FIG. 9 shows an illustration of a user interface according to various embodiments;

DETAILED DESCRIPTION

Figure 1A:
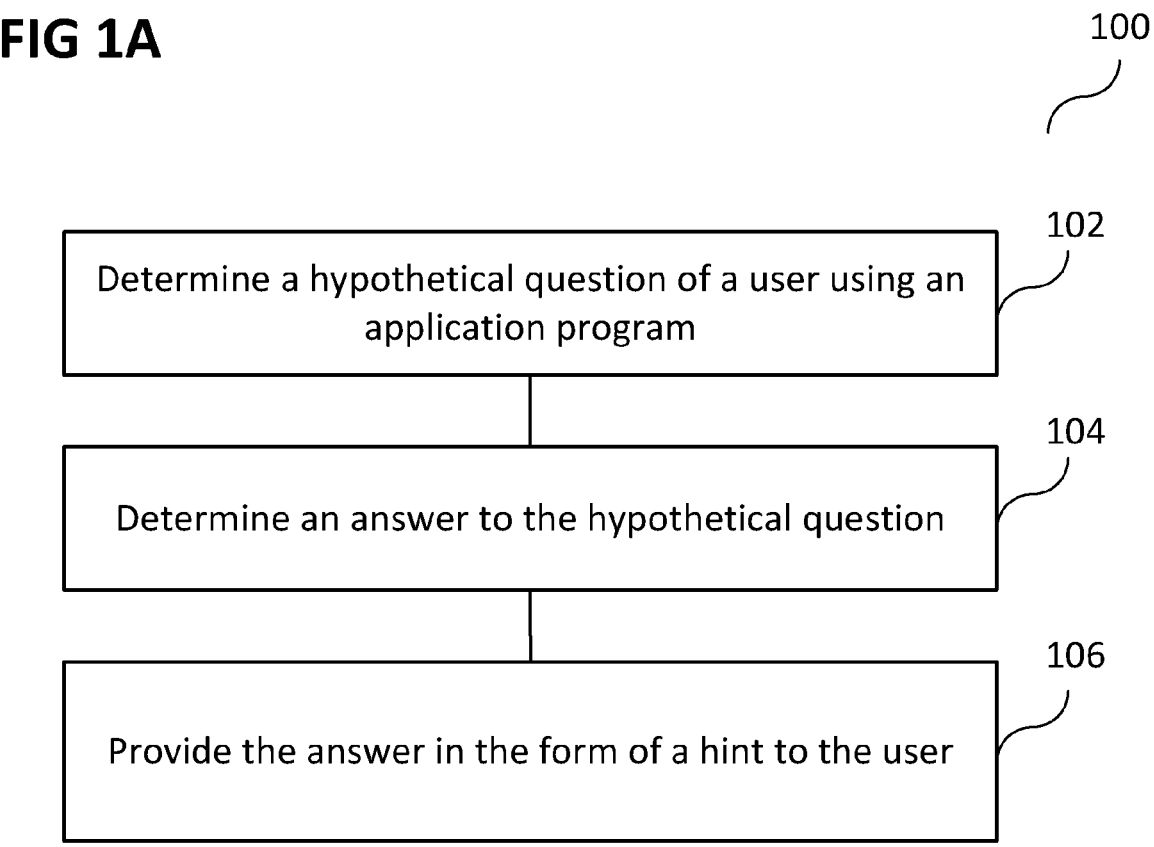
FIG. 1A shows a flow diagram illustrating a data providing method according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In this context, the data providing system (which may for example be a data providing device) as described in this description may include a memory which is for example used in the processing carried out in the data providing system. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

Garners may get stuck during game play and may be forced to pause game play in order to research on how to proceed. According to various embodiments, devices and methods may be provided to facilitate game play for gamers. According to various embodiments, a real-time game coach or mentor that provides oral answers to oral questions posed by the gamer may be provided and may help the gamer to avoid situations like these.

According to various embodiments, an AI (artificial intelligence) game mentor (which may be referred to as virtual game coach) may be provided.

According to various embodiments, a real-time game coach/mentor may provide game advice via audio during game play. The real-time game coach may provide answers to oral questions posed by the gamer during game play.

FIG. 1A shows a flow diagram 100 illustrating a data providing method according to various embodiments. In 102, a hypothetical question of a user using an application program may be determined. In 104, an answer to the hypothetical question (for example in relation to the usage of the application program) may be determined. In 106, the answer may be provided in the form of a hint to the user.

In other words, according to various embodiments, an answer to a question that a user might have will be provided.

According to various embodiments, the data providing method may further include: storing history information of at least one further database; and determining the hypothetical question based on the historical information.

According to various embodiments, the data providing method may further include: storing application information about the application program used by the user; and determining the hypothetical question based on the application information.

According to various embodiments, the data providing method may further include: storing profile information of the user; and determining the hypothetical question based on the profile information.

According to various embodiments, the data providing method may further include: storing real-time information of at least one of the application program used by the user or of a system used by the user for executing the application program; and determining the hypothetical question based on the real-time information.

According to various embodiments, the data providing method may further include providing the hint to the user using at least one of audio information, visual information, text information, vibration information, pressure information, and heat information.

According to various embodiments, the data providing method may further include: receiving a question from the user; determining an answer to the receive question; and providing the answer to the user.

According to various embodiments, the data providing method may further include receiving the question from the user using at least one of audio information, visual information, text information, gestures information, button depression information, neural information, movement information, biosensor information, touch information, smell information, or taste information.

According to various embodiments, the data providing method may further include providing the answer to the user using at least one of audio information, visual information, text information, vibration information, pressure information, and heat information.

According to various embodiments, the application program may include or may be or may be included in a computer game.

Figure 1B:
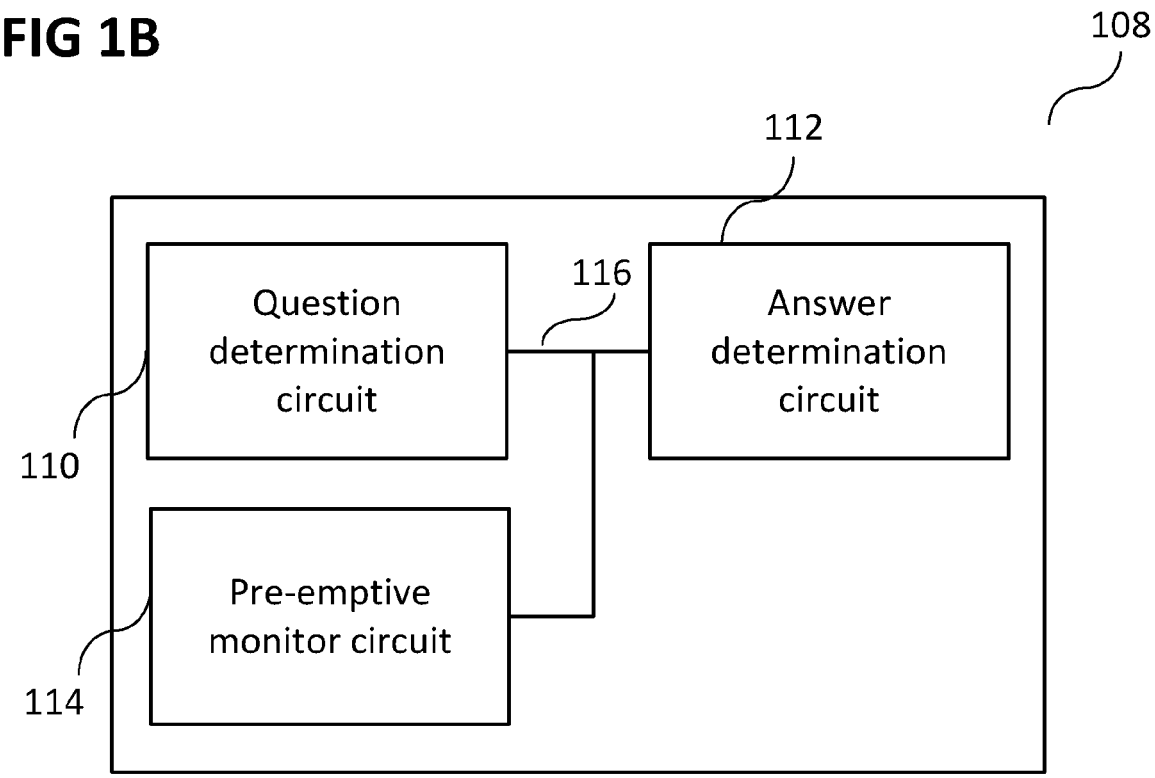
FIG. 1B shows a data providing system according to various embodiments.

FIG. 1B shows a data providing system 108 according to various embodiments. The data providing system 108 may include a question determination circuit 110 configured to determine a hypothetical question of a user using an application program. The data providing system 108 may further include an answer determination circuit 112 configured to determine an answer to the hypothetical question. The data providing system 108 may include a pre-emptive monitor circuit 114 (which may for example be a pre-emptive monitor 212 or a part thereof, like will be described in more detail below) configured to provide the answer in the form of a hint to the user. The question determination circuit 110, the answer determination circuit 112, and the pre-emptive monitor circuit 114 may be coupled with each other, like indicated by lines 116, for example electrically coupled, for example using a line or a cable, and/or mechanically coupled.

Figure 1C:
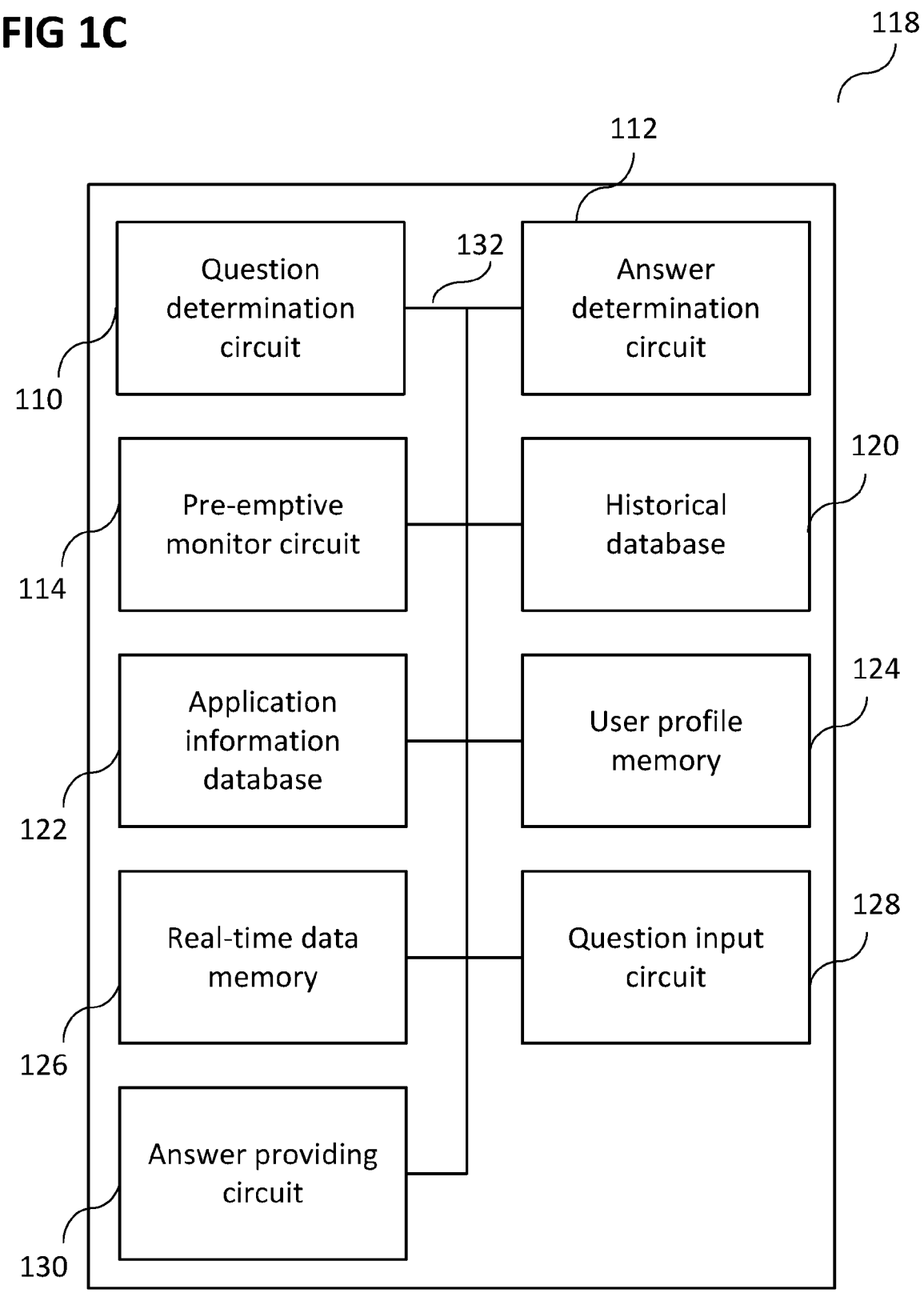
FIG. 1C shows a data providing system according to various embodiments.

FIG. 1C shows a data providing system 118 according to various embodiments. The data providing system 118 may, similar to the data providing system 118 shown in FIG. 1B, include a question determination circuit 110 configured to determine a hypothetical question of a user using an application program. The data providing system 118 may, similar to the data providing system 118 shown in FIG. 1B, further include an answer determination circuit 112 configured to determine an answer to the hypothetical question. The data providing system 118 may, similar to the data providing system 118 shown in FIG. 1B, include a pre-emptive monitor circuit 114 (which may for example be a pre-emptive monitor 212 or a part thereof, like will be described in more detail below) configured to provide the answer in the form of a hint to the user. The data providing system 118 may further include a historical database 120, like will be described in more detail below. The data providing system 118 may further include an application information database 112, like will be described in more detail below. The data providing system 118 may further include a user profile memory 124, like will be described in more detail below. The data providing system 118 may further include a real-time data memory 126, like will be described in more detail below. The data providing system 118 may further include a question input circuit 128, like will be described in more detail below. The data providing system 118 may further include an answer providing circuit 130. The question determination circuit 110, the answer determination circuit 112, the pre-emptive monitor circuit 114, the historical database 120, the application information database 112, the user profile memory 124, the real-time data memory 126, the question input circuit 128, and the answer providing circuit 130 may be coupled with each other, like indicated by lines 132, for example electrically coupled, for example using a line or a cable, and/or mechanically coupled.

According to various embodiments, a historical database 120 (which may correspond to the historical database 202 like described in more detail below) may be configured to store history information of at least one further database. The question determination circuit 110 may be configured to determine the hypothetical question based on the historical information.

According to various embodiments, the application information database (for example the game info database 204 like described in more detail below) may be configured to store application information about the application program used by the user. The question determination circuit 110 may be configured to determine the hypothetical question based on the application information.

According to various embodiments, a user profile memory 124 may be configured to store profile information (for example the player profile 206 like described in more detail below) of the user. The question determination circuit 110 may be configured to determine the hypothetical question based on the profile information.

According to various embodiments, the real-time data memory 126 (for example the real-time data provide 208 like described in more detail below) may be configured to store real-time information of at least one of the application program used by the user or of a system used by the user for executing the application program. The question determination circuit 110 may be configured to determine the hypothetical question based on the real-time information.

According to various embodiments, the pre-emptive monitor circuit 114 maybe is configured to provide the hint to the user using at least one of audio information, visual information, text information, vibration information, pressure information, and heat information.

According to various embodiments, the question input circuit 128 may be configured to receive a question from the user. The answer determination circuit 112 may be configured to determine an answer to the receive question. The answer providing circuit 130 may be configured to provide the answer to the user.

According to various embodiments, the question input circuit 128 may be configured to receive the question from the user using at least one of audio information, visual information, text information, gestures information, button depression information, neural information, movement information, biosensor information, touch information, smell information, or taste information.

According to various embodiments, the answer providing circuit 130 may be configured to provide the answer to the user using at least one of audio information, visual information, text information, vibration information, pressure information, and heat information.

According to various embodiments, the application program may include or may be or may be included in a computer game.

According to various embodiments, a computer-readable medium may be provided. The computer-readable medium may include instructions which, when executed by a computer, make the computer perform a data providing method. The data providing method may include: determining a hypothetical question of a user using an application program; determining an answer to the hypothetical question; and providing the answer in the form of a hint to the user.

According to various embodiments, the computer-readable medium may further include instructions which, when executed by a computer, make the computer perform: storing history information of at least one further database; and determining the hypothetical question based on the historical information.

According to various embodiments, the computer-readable medium may further include instructions which, when executed by a computer, make the computer perform: storing application information about the application program used by the user; and determining the hypothetical question based on the application information.

According to various embodiments, the computer-readable medium may further include instructions which, when executed by a computer, make the computer perform: storing profile information of the user; and determining the hypothetical question based on the profile information.

According to various embodiments, the computer-readable medium may further include instructions which, when executed by a computer, make the computer perform: storing real-time information of at least one of the application program used by the user or of a system used by the user for executing the application program; and determining the hypothetical question based on the real-time information.

According to various embodiments, the computer-readable medium may further include instructions which, when executed by a computer, make the computer perform providing the hint to the user using at least one of audio information, visual information, text information, vibration information, pressure information, and heat information.

According to various embodiments, the computer-readable medium may further include instructions which, when executed by a computer, make the computer perform: receiving a question from the user; determining an answer to the receive question; and providing the answer to the user.

According to various embodiments, the computer-readable medium may further include instructions which, when executed by a computer, make the computer perform receiving the question from the user using at least one of audio information, visual information, text information, gestures information, button depression information, neural information, movement information, biosensor information, touch information, smell information, or taste information.

According to various embodiments, the computer-readable medium may further include instructions which, when executed by a computer, make the computer perform providing the answer to the user using at least one of audio information, visual information, text information, vibration information, pressure information, and heat information.

According to various embodiments, the application program may include or may be or may be included in a computer game.

FIG. 2 shows an illustration 200 of an overall mechanism of a system according to various embodiments. The system may include a collection of data sources, processing engines and an interface to users. For example, the system may include a historical database 202, a game info database 204, a player profile 206, a real-time data provider 208, a question and answer engine 210 (in other words: question and answer module or question and answer circuit) which intelligently processes the data provided by a user interface 214, and a pre-emptive monitor 212 which continuously analyses and provide suggestions to the user.

According to various embodiments, the system according to various embodiments may be designed to be cyclic so that the system can learn and improve itself.

Figure 3:
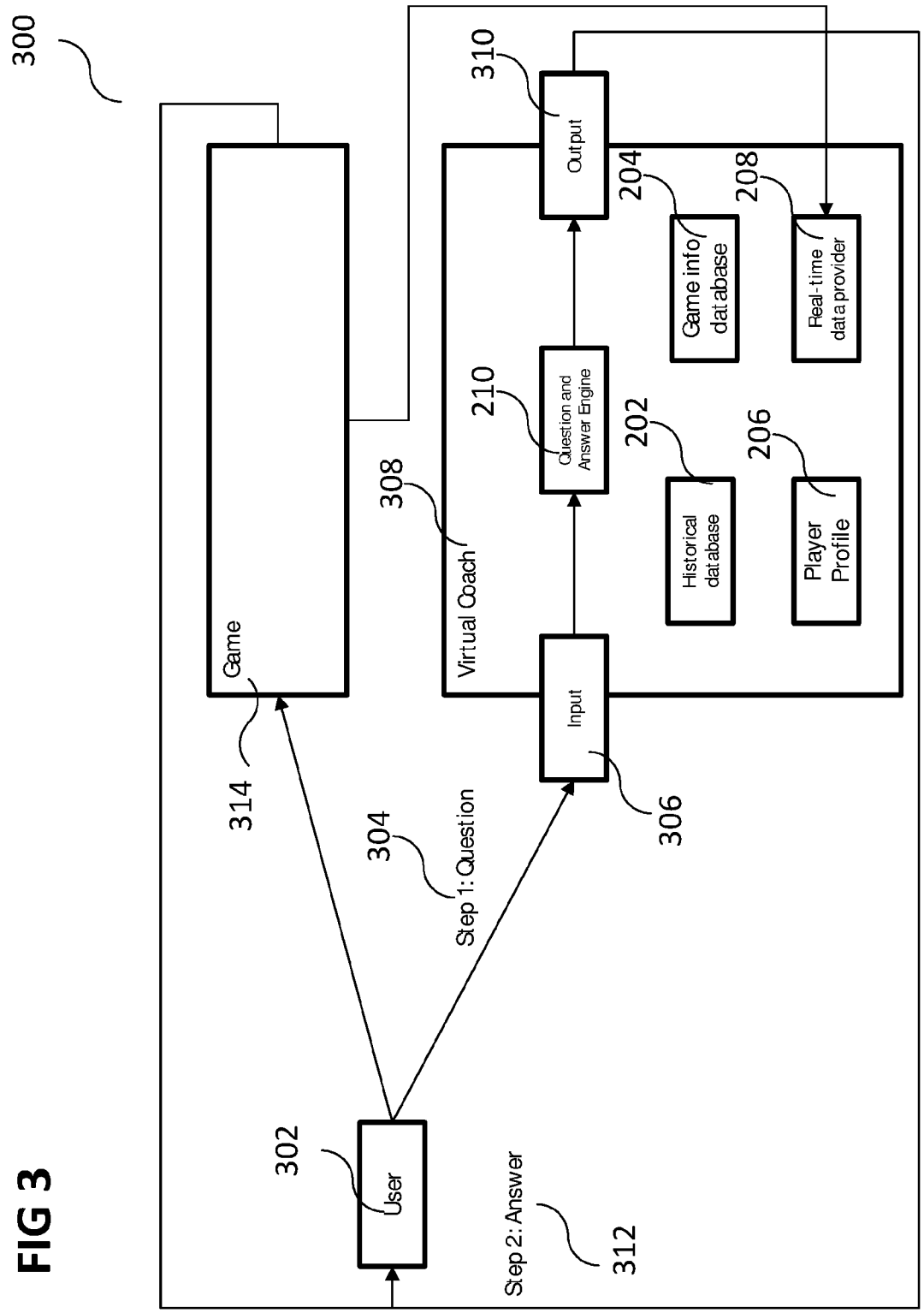
FIG. 3 shows an illustration of a question and answer flow according to various embodiments.

FIG. 3 shows an illustration 300 of a question and answer flow according to various embodiments. The diagram of illustration 300 shows how a user would initiate a question to a system and get a response from it according to various embodiments. A user 302 may initiate a question 304 to the system, for example providing an input 305 into the system, through one or more forms of input supported by the system. The question and answer engine 210 may process the question and based on the collection of data available to it, formulate an answer. This answer may then be provided back the user 302 through one or more forms of output 310 supported by the system. It will be understood that several of the components shown in FIG. 3 may collectively be referred to as virtual coach 308. It is to be noted that the user 302 may continue to play his game 314 and his game 314 may continue to provide updated data to the system. The questions and answers may be overlaid on top of the user interactions that user 302 is already experiencing as part of the game 314 he is playing.

Figure 4:
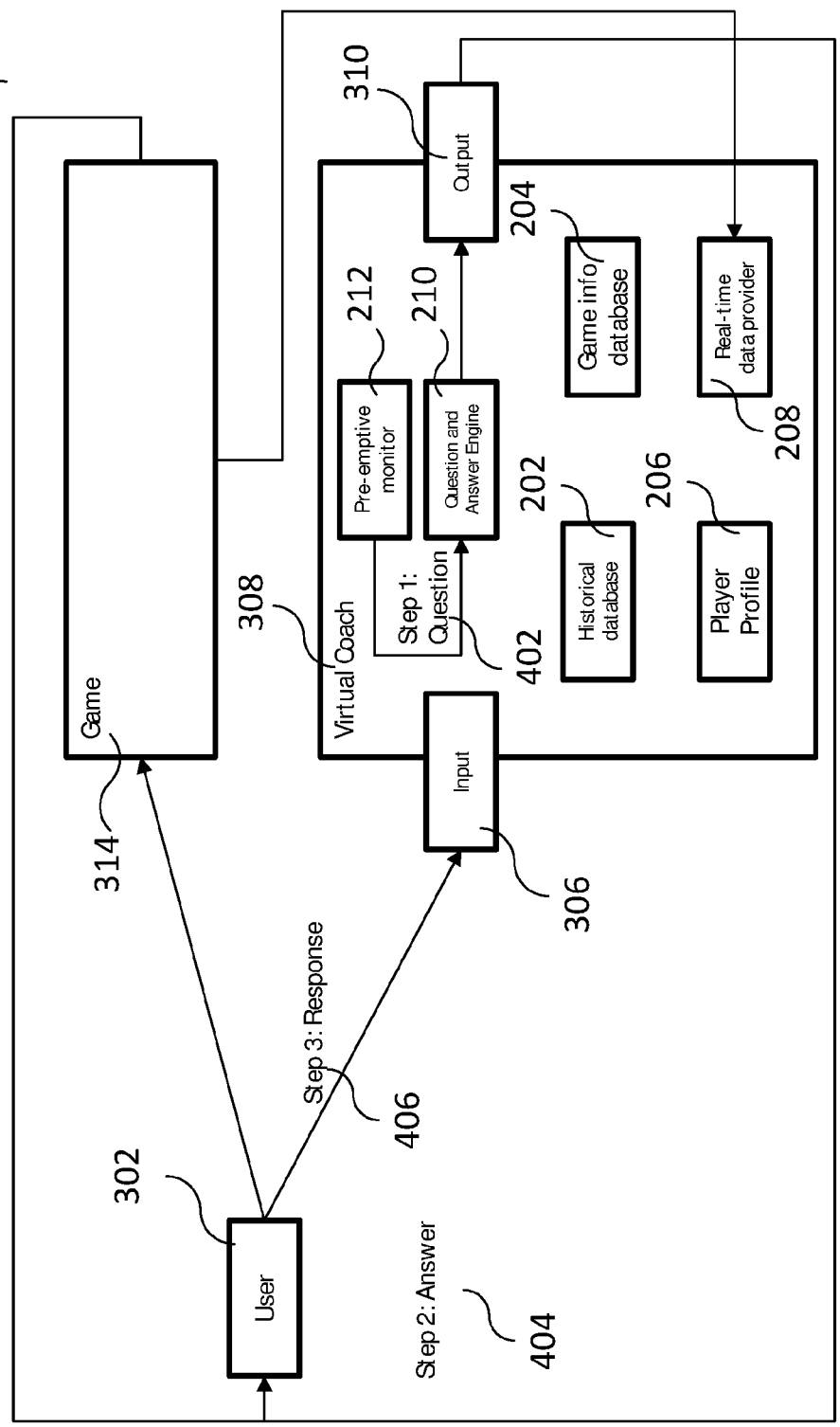
FIG. 4 shows an illustration of a pre-emptive monitor flow according to various embodiments.

FIG. 4 shows an illustration 400 of a pre-emptive monitor flow according to various embodiments. The diagram of illustration 400 shows how the pre-emptive monitor 212 provides user 302 with hints or guides that might be relevant to the user. The pre-emptive monitor 212 may analyze the collection of data available to the system and may figure out if there is information that it would like to present to the user 302. The pre-emptive monitor 212 may be responsible for forming the question 402 that would be forwarded to the question and answer engine 210. The answer 404 may be presented to the user 302 as a hint. The user 302 may be able to respond (like illustrated by arrow 406) and continue with more questions and answers, play the game 314 according to the advice or ignore the hint completely. Such an interaction may also be overlaid on top of the game 314 and may be designed to augment instead of interrupting the game play.

Figure 5:
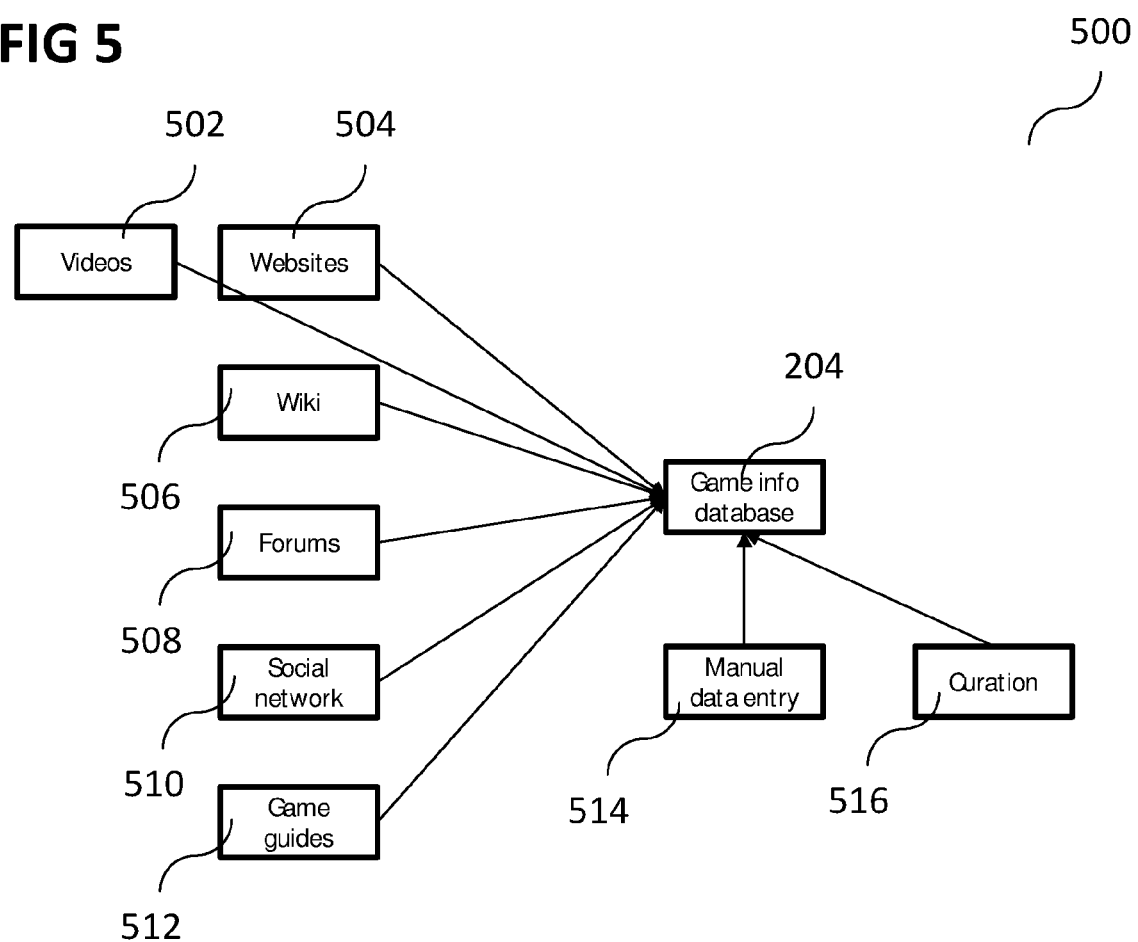
FIG. 5 shows an illustration of a data info database according to various embodiments.

FIG. 5 shows an illustration 500 of a data info database (in other words: a game info database 204) according to various embodiments. The game info database 204 may be considered as the repository of all known information of any game that is supported according to various embodiments.

This may include basic information like the type of game, the characters/hero/classes in that game and this may extend deep into the game such strategy and guides of each character/class. According to various embodiments, the game info database 204 may be populated by various methods:
  Crawling external webpages 504;
  User direct manipulation via a wiki 506 or by flagging changes to data (for example curation 516);
  Direct manipulation (in other words: manual data entry 514) from internal staff or an admin.

Further input to the game info database 204 may be videos 502, forums 508, social networks 510, or game guides 512.

Figure 6:
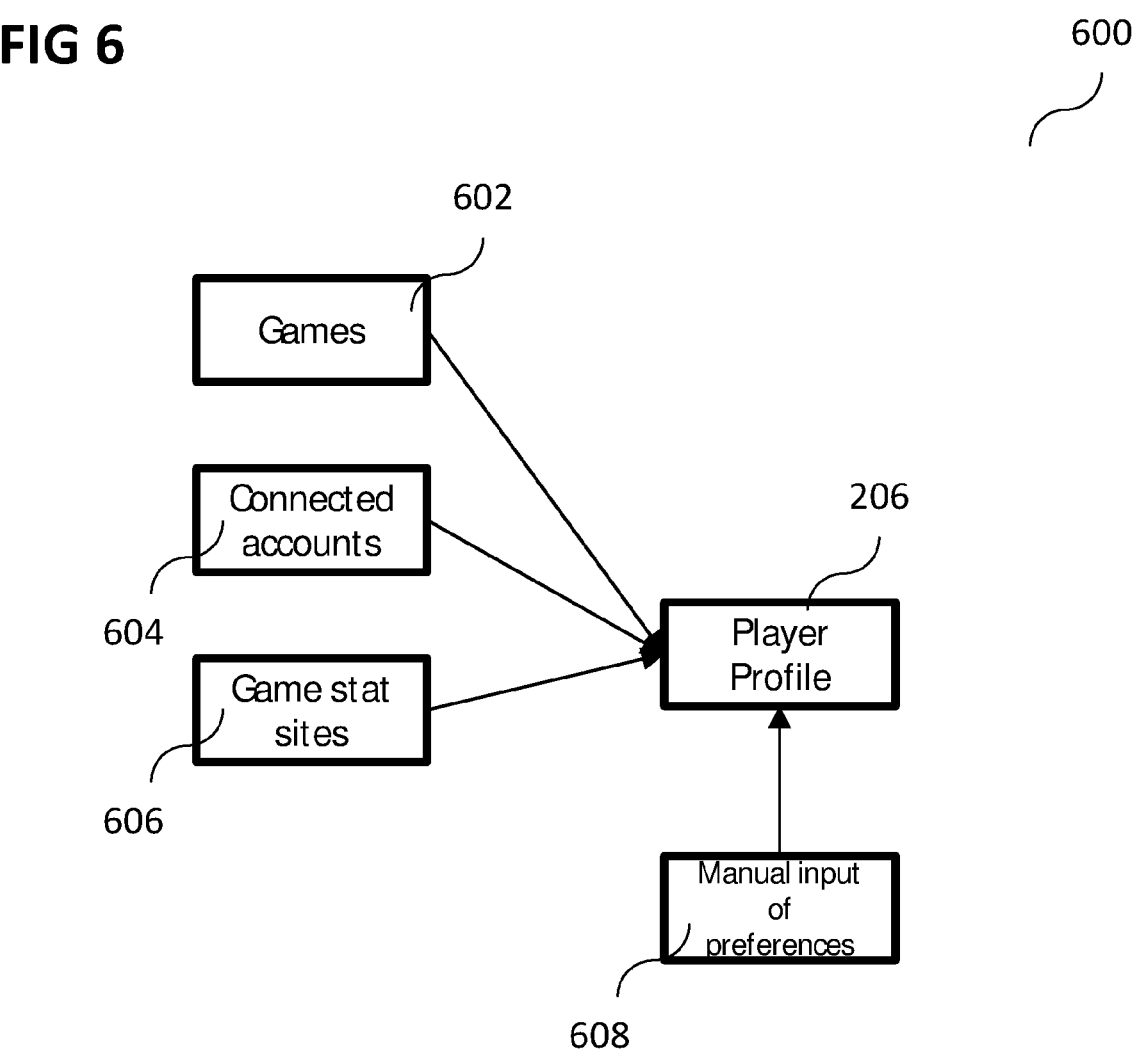
FIG. 6 shows an illustration of a player profile according to various embodiments.

FIG. 6 shows an illustration 600 of a player profile 206 according to various embodiments. The player profile 206 may include or may consist of information that may be known about every user on the platform. This may be a combination of preferences that the user may explicitly provide (for example using a manual input of preferences 608) and data that may be gathered from a user's game play. For example, this may include information that list out the games 602 that he owns, he plays and the time spent on each game. However, this may be extremely deep and may also include the preferred character/hero/champion that he plays, the results of the matches that he plays and the environment of that match such as the hero of the other players in the game and the players behind those heroes.

The player profile 206 may be constructed from various sources:
  Preferences that the user provides (for example via the manual input of preferences 608);
  Having the user have a software that monitors his game plays and build a historical data on the way he plays, the choices of heroes/class/champion or equipment;
  Crawl/Scrape or integrate with game sites (for example game stat sites 606) which collect match information and performance information of each user (for example, there may be websites which provide very deep information on game plays, and which may give very detailed information on how a particular gamer performs in his games; different people may have different playstyles and different strengths, and in competitive games, they may also meet up with people with different playstyles and strengths; all of this may be made complicated by the different strengths and weakness of each hero that the game picked and how skilled that particular gamer is in controlling that particular hero, and all this may contribute to how good a recommendation/answer to the gamer is);
  Past queries and responses and how a user responded to those (for example, information on past queries and answers given to a particular and how that user responded and performed under those replies or guidance user may be collected and stored); and/or
  connected accounts 604 (which for example may refer to connecting a game account to the system according to various embodiments so that the system according to various embodiments may get more information about that user from the account that he has connected; for example, a profile page of a game may provide plenty of information that may be used to help the engine according to various embodiments to come up with a better answer/hint).

Figure 7:
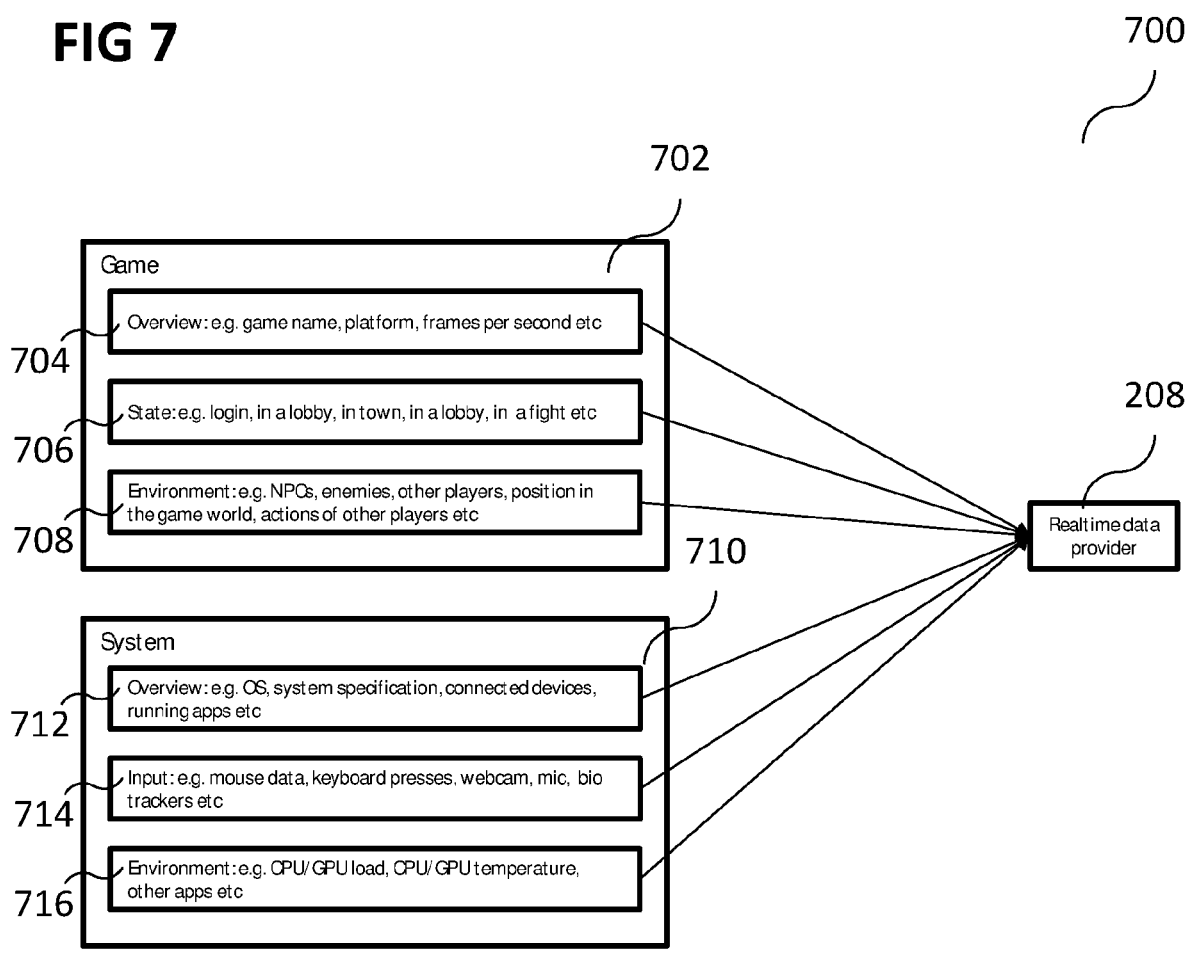
FIG. 7 shows an illustration of a real-time data provider according to various embodiments.

FIG. 7 shows an illustration 700 of a real-time data provider 208 according to various embodiments. The real-time data provider 208 may be designed to figure out the data from the game 702 that user is currently playing and also data from other sources 710 (for example system information). This data includes:
  Which game the user is playing on and the platform that game runs on, like indicated in 704;
  The state of the game e.g. is the user in the lobby, in town, in middle of a fight, like indicated in 706;
  The situation of the game e.g. where are the enemies, where the user is in the virtual world, Quests that are in progress, like indicated in 708;

a system overview, for example operating system (OS), system specifications, connected devices, and/or running apps, like indicated in 712;

User's input into the system such as mouse, keyboard but should theoretically include mic and webcam and other devices, like indicated in 714;

The system's current operational information e.g. CPU (central processing unit)/GPU (graphics processing unit) load and temperature, like indicated in 716.

Getting real-time information directly from the game 702 may be not trivial and according to various embodiments, there may be provided various ways to do it:

Getting an integration done in cooperation with the game developer may be ideal but may require the game developer to willingly expose their data to us through an API (application programming interface);

Hooking into the game and determine the game state and environment based the memory of that used by the game;

Perform analysis on images/audio/text that are presented to the user.

This live data may be provided to other modules according to various embodiments for their analyses.

Figure 8:
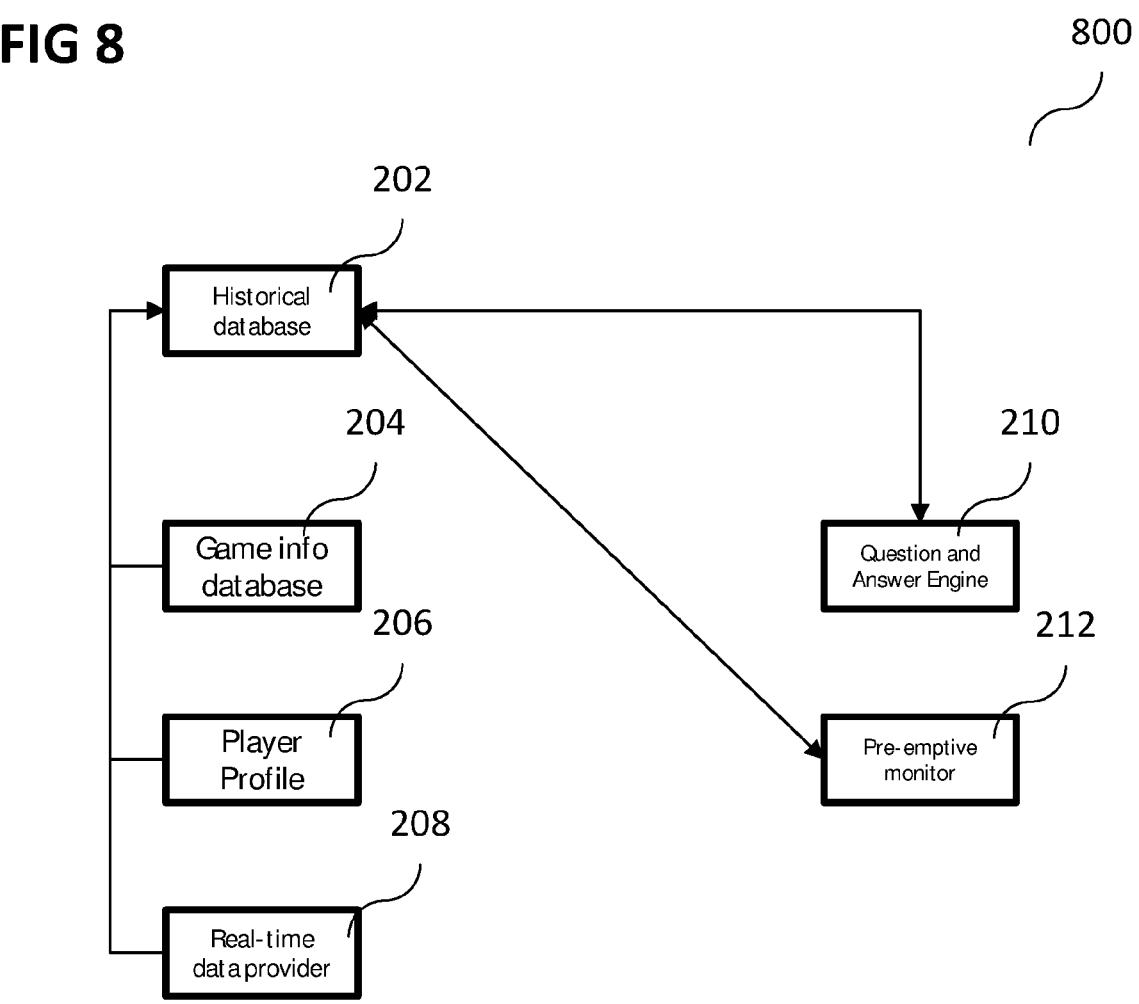
FIG. 8 shows an illustration including a historical database according to various embodiments.

FIG. 8 shows an illustration 800 including a historical database 202 according to various embodiments. The historical database 202 may represent the data at a specific point in time. Game information (for example provided in the game info database 204) may change over time because of balances changes or new content. The player profile 206 may change because of changes in player preference or skill level. Real-time data (for example provided by the real-time data provider 208) may change as the game goes on. All such information may be catalogued in the historical database 202 to provide chronological context and correctness of data at a particular point in time.

The historical database 202 may furthermore collect and store information on past queries and answers given to a particular user and how that user responded and performed under those replies or hints.

FIG. 9 shows an illustration 900 of a user interface according to various embodiments. The question an answer engine 210 may work (for example on a real-time basis) to accept queries and generate replies which are direct answers or direct guidance to the questions asked. On top of the game info database and the player profile, the question an answer engine 210 may use the real-time data from the real-time data provider to put those queries in the context that user is currently experiencing. The queries and answers to this module may need to be handled in a standard mechanism so that the question an answer engine 210 may consume queries in multiple formats and give replies in multiple formats.

A basic user interface may be pure text queries and replies, but the interface may be extensible to allow other forms interactions with the user, such as:

Sending a text query 916 and reply via text 936 to the user;

Listen to user's verbal queries (for example via audio 912) and replies to the user through visual feedback 934 or add to the audio 932 that the user is listening to;

Present user with a visual interface 914 and provide an answer by overlaying an image on top of the game;

and various combinations of these and the following interfaces.

The list above are exemplary interfaces, and further interactions may be provided, such as;

Being able to take input from human gestures 918 and provide feedback in the form of tactile feedback (for example via vibration 938 and/or pressure 940);

Direct neural interfaces 922;

Interactions with a person's sense of smell 908 or taste 910.

Such intelligence may be accessed by another machine or even another artificial intelligence through an API.

It is to be noted that depending on the interfaces that a user would like to interact with, there may be additional technologies provided such as:

For an audio input, speech recognition and natural language processing technologies may be provided;

For an audio output, speech to text technology may be provided;

For a visual output on top of the game, a game overlay technology may be provided.

Both the input and output may support multiple inputs/outputs at the same time. The input may be aggregated at an input aggregator 902, which may be programmable using an API 904. The input may then be provided to the question and answer machine 210. The outputs may be composited by an output compositor 928, which may be programmable using an API 930.

The question an answer engine 210 may combine multiple inputs into a single input and may deliver outputs across multiple medium and be able to deliver a coherent message instead of simply duplicating the message.

Further inputs may include depression of a button 920, input by movement detection 924, biosensors 926, or touch sensors 906. Further output may include heat 942.

According to various embodiments, a constant monitor (for example a pre-emptive monitor 212), which may provide constant monitoring, may be provided. This component may continuously analyze the state of the game and the state of the player so that it can pre-emptively provide assistance to the player. The pre-emptive monitor 212 may directly access the information of the real-time data 208 provider to figure out what the user needs pre-emptively. The pre-emptive monitor 212 may format this as a query that would be sent to the question and answer module 210 and may retrieve the answer. The pre-emptive monitor 212 may present the result through the interfaces preferred by the user and delivered in a way consistent with direct question and answers which are initiated by the user.

The system according to various embodiments may be cyclic: It may record and examine its past answers and responses from the user so that the system may continuously learn and improve.

In the following, a use case example of a system and method according to various embodiments will be described. A user may start a League of Legends game while the system according to various embodiments may be running in the background. Once the user starts the game, the system according to various embodiments may continue to monitor and notice that the user had accumulated so much gold. The system according to various embodiments may show an overlay in game with the recommended item to buy, but the user may not be familiar with it. The user may hover his mouse, cursor over the recommended item but even though it looks interesting, the user may not fully understand how this would affect his current game play. The user may verbally tell the system according to various embodiments to show more information about that item, and the system according to various embodiments may open up an overlay window to show the details of that item. The user may like that recommendation and may verbally tell the system according to various embodiments to remind him to buy that item when the user is back to his base. The system according to various embodiments may verbally confirm that it understood and may hide the item purchase recommendation. The system according to various embodiments may continue to monitor and when the user is back at this base, the system according to various embodiments may verbally remind the user that he should make the purchase, and may visually overlay the recommended item again. The user may purchase the item and the system according to various embodiments may hide its recommendation again.

According to various embodiments, constant monitoring may be provided.

According to various embodiments, advice may be offered which is relevant to the user's current situation.

According to various embodiments, a mechanism may be provided for a user to converse and get more information.

According to various embodiments, various inputs and outputs may be combined in this system.

According to various embodiments, game play may be smoother because a player may make better decisions with the game coach according to various embodiments.

According to various embodiments, a communication method may be provided. The communication method may include: generating a hint on solving a situation in an electronic game; and transmitting the hint to a server configured to provide the hint to gamers playing the electronic game.

According to various embodiments, a communication method may be provided. The communication method may include: receiving a hint on solving a situation in an electronic game; storing the hint on a server; and providing the hint to gamers playing the electronic game.

According to various embodiments, a computer-readable medium may be provided. The computer-readable medium may include instructions which, when executed by a computer, make the computer (wherein it will be understood that a computer may be any device configured to execute instructions, for example a personal computer (PC), a console, a mobile radio communication device, or a table device) perform a communication method. The communication method may include: generating a hint on solving a situation in an electronic game; and transmitting the hint to a server configured to provide the hint to gamers playing the electronic game.

According to various embodiments, a computer-readable medium may be provided. The computer-readable medium may include instructions which, when executed by a computer, make the computer perform a communication method. The communication method may include: receiving a hint on solving a situation in an electronic game; storing the hint on a server; and providing the hint to gamers playing the electronic game.

According to various embodiments, a communication device may be provided. The communication device may include: a hint generation circuit configured to generate a hint on solving a situation in an electronic game; and a transmitter configured to transmit the hint to a server configured to provide the hint to gamers playing the electronic game.

According to various embodiments, a server may be provided. The server may include: a receiver configured to receive a hint on solving a situation in an electronic game; a storage configured to store the hint; and a transmitter configured to provide the hint to gamers playing the electronic game.

In this context, the communication device as described in this description may include a memory which is for example used in the processing carried out in the communication device. In this context, the server as described in this description may include a memory which is for example used in the processing carried out in the server. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

Figure 10A:
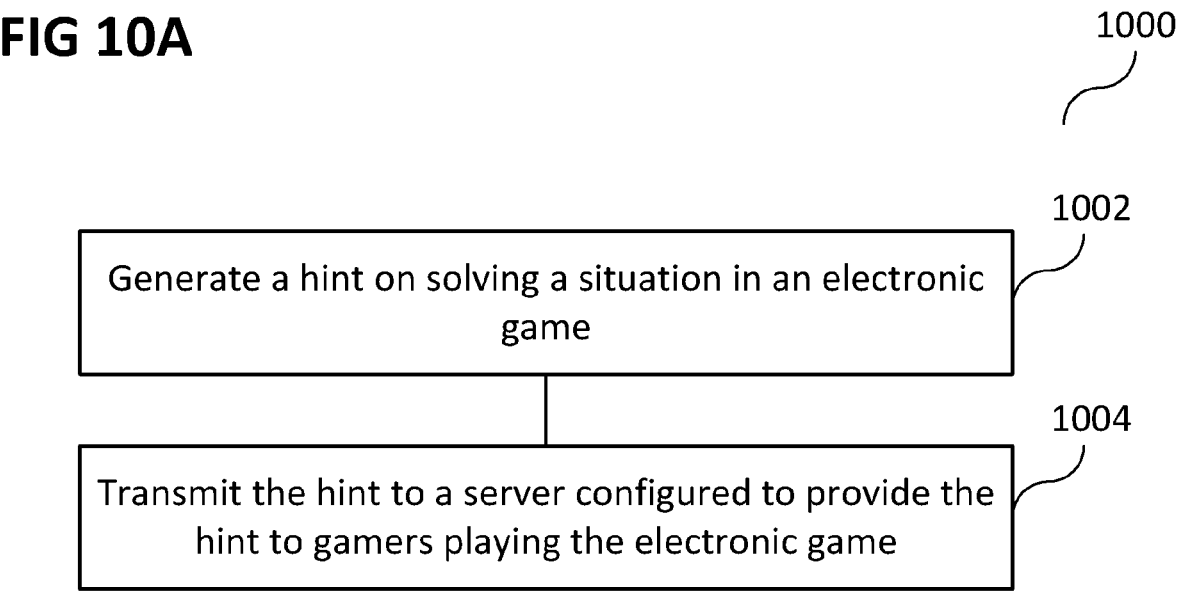
FIG. 10A shows a flow diagram illustrating a communication method according to various embodiments.

FIG. 10A shows a flow diagram 1000 illustrating a communication method according to various embodiments. In 1002, a hint on solving a situation in an electronic game (for example computer game or a console game) may be generated. In 1004, the hint may be transmitted to a server configured to provide the hint to gamers playing the electronic game.

In other words, a user may provide a hint for an electronic game he is playing to a server, which in turn may provide the hint to other gamers.

According to various embodiments, the hint may include or may be included in at least one of textual information, audio information, or video information.

According to various embodiments, the hint may be generated on a companion device configured to display a further hint.

According to various embodiments, the communication method may further include transmitting a vote for the further hint.

Figure 10B:
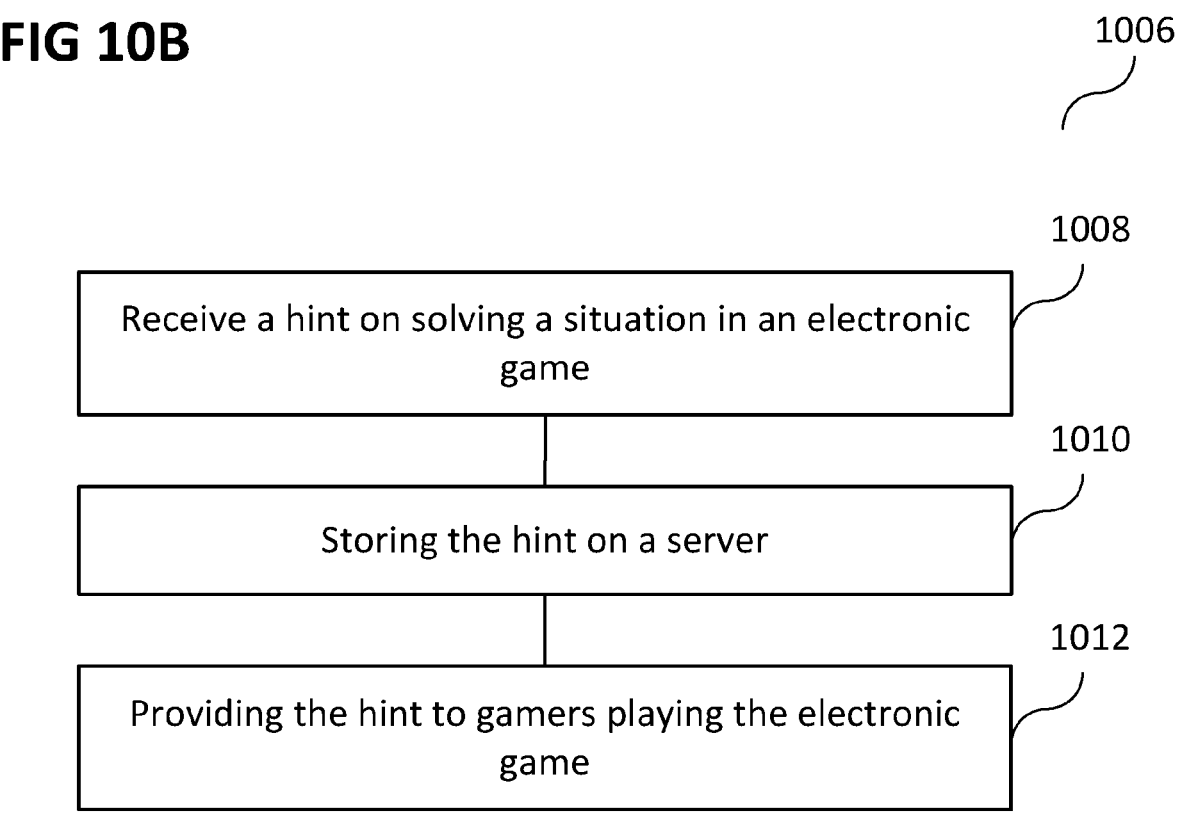
FIG. 10B shows a flow diagram illustrating a communication method according to various embodiments.

FIG. 10B shows a flow diagram 1006 illustrating a communication method according to various embodiments. In 1008, a hint on solving a situation in an electronic game (for example a computer game or a console game) may be received. In 1010, the hint may be stored on a server (for example in a storage (in other words: memory) of the server). In 1012, the hint may be provided to gamers playing the electronic game.

According to various embodiments, the hints may include or may be included in at least one of textual information, audio information, or video information.

According to various embodiments, the communication method may further include storing a plurality of hints for a same situation on the server.

According to various embodiments, the communication method may further include receiving a vote for at least one hint of the plurality of hints.

According to various embodiments, a hint of the plurality of hints with a highest number of votes among the plurality of hints may be provided to the gamers.

According to various embodiments, the hint may be provided as at least one of an overlay to the electronic game or as a notification in a companion app.

According to various embodiments, a computer-readable medium may be provided. The computer-readable medium may include instructions which, when executed by a computer, make the computer perform a communication method. The communication method may include: generating a hint on solving a situation in an electronic game (for example a computer game or a console game); and transmitting the hint to a server configured to provide the hint to gamers playing the electronic game.

According to various embodiments, the hint may include or may be included in at least one of textual information, audio information, or video information.

According to various embodiments, the hint may be generated on a companion device configured to display a further hint.

According to various embodiments, the computer-readable medium may further include instructions which, when executed by a computer, make the computer perform transmitting a vote for the further hint.

According to various embodiments, a computer-readable medium may be provided. The computer-readable medium may include instructions which, when executed by a computer, make the computer perform a communication method. The communication method may include: receiving a hint on solving a situation in an electronic game (for example a computer game or a console game); storing the hint on a server; and providing the hint to gamers playing the electronic game.

According to various embodiments, the hints may include or may be included in at least one of textual information, audio information, or video information.

According to various embodiments, the computer-readable medium may further include instructions which, when executed by a computer, make the computer perform: storing a plurality of hints for a same situation on the server.

According to various embodiments, the computer-readable medium may further include instructions which, when executed by a computer, make the computer perform: receiving a vote for at least one hint of the plurality of hints.

According to various embodiments, a hint of the plurality of hints with a highest number of votes among the plurality of hints may be provided to the gamers.

According to various embodiments, the hint may be provided as at least one of an overlay to the electronic game or as a notification in a companion app.

Figure 10C:
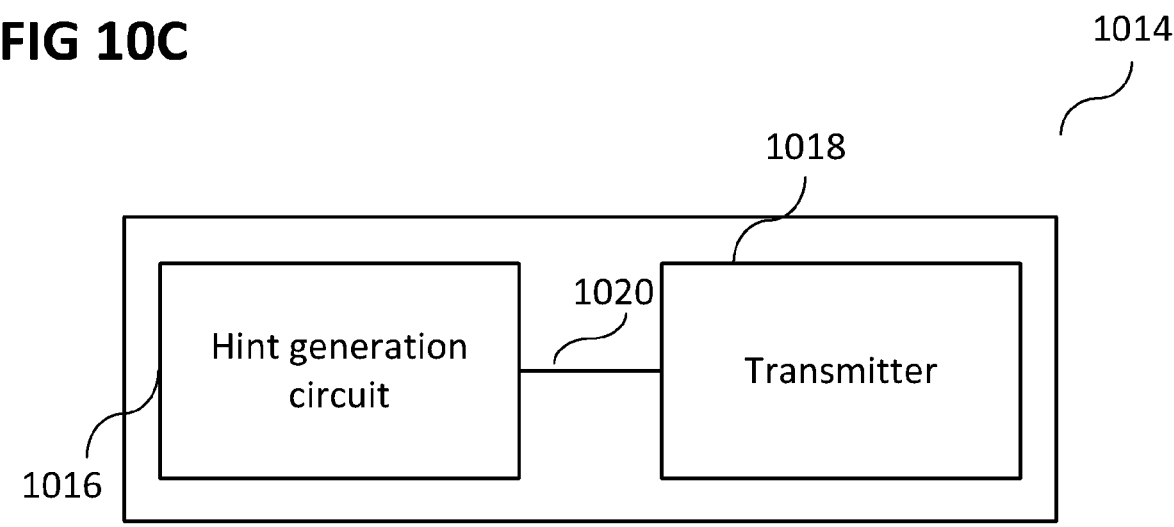
FIG. 10C shows a communication device according to various embodiments.

FIG. 10C shows a communication device 1014 according to various embodiments. The communication device 1014 may include a hint generation circuit 1016 configured to generate a hint on solving a situation in an electronic game (for example a computer game or a console game). The communication device 1014 may further include a transmitter 1018 configured to transmit the hint to a server configured to provide the hint to gamers playing the electronic game. The hint generation circuit 1016 and the transmitter 1018 may be coupled with each other, like indicated by line 1020, for example electrically coupled, for example using a line or a cable, and/or mechanically coupled.

According to various embodiments, the hint may include or may be included in at least one of textual information, audio information, or video information.

According to various embodiments, the hint may be generated on a companion device configured to display a further hint.

According to various embodiments, the transmitter 1018 may further be configured to transmit a vote for the further hint.

Figure 10D:
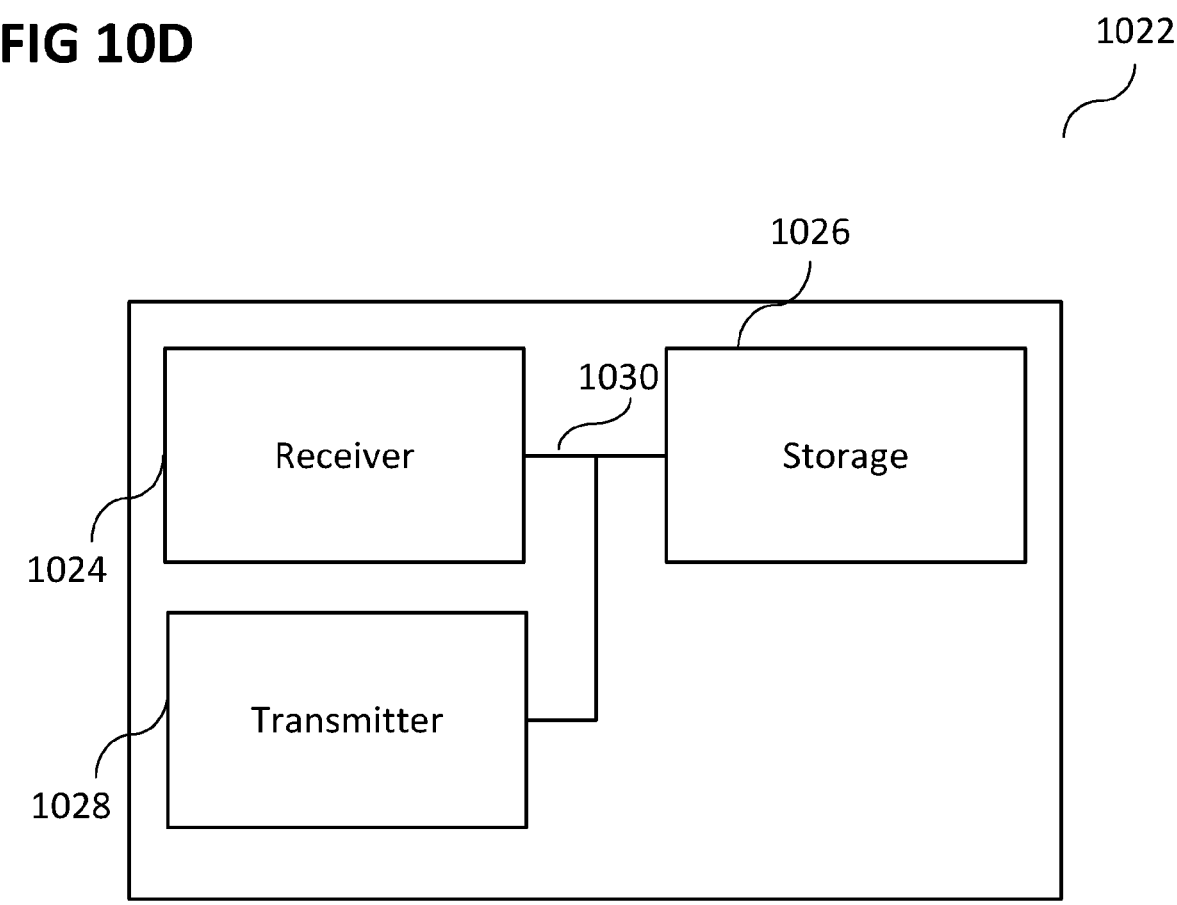
FIG. 10D shows a server according to various embodiments.

FIG. 10D shows a server 1022 according to various embodiments. The server 1022 may include a receiver 1024 configured to receive a hint on solving a situation in an electronic game (for example a computer game or a console game). The server 1022 may further include a storage 1026 (in other words: a memory) configured to store the hint. The server 1022 may further include a transmitter 1028 configured to provide the hint to gamers playing the electronic game. The receiver 1024, the storage 1026, and the transmitter 1028 may be coupled with each other, like indicated by lines 1030, for example electrically coupled, for example using a line or a cable, and/or mechanically coupled.

According to various embodiments, the hints may include or may be included in at least one of textual information, audio information, or video information.

According to various embodiments, the storage 1026 may further be configured to store a plurality of hints for a same situation.

According to various embodiments, the receiver 1024 may further be configured to receive a vote for at least one hint of the plurality of hints.

According to various embodiments, the transmitter 1028 may be configured to provide a hint of the plurality of hints with a highest number of votes among the plurality of hints to the gamers.

According to various embodiments, the transmitter 1028 is configured to provide the hint as at least one of an overlay to the electronic game or as a notification in a companion app.

Figure 11A:
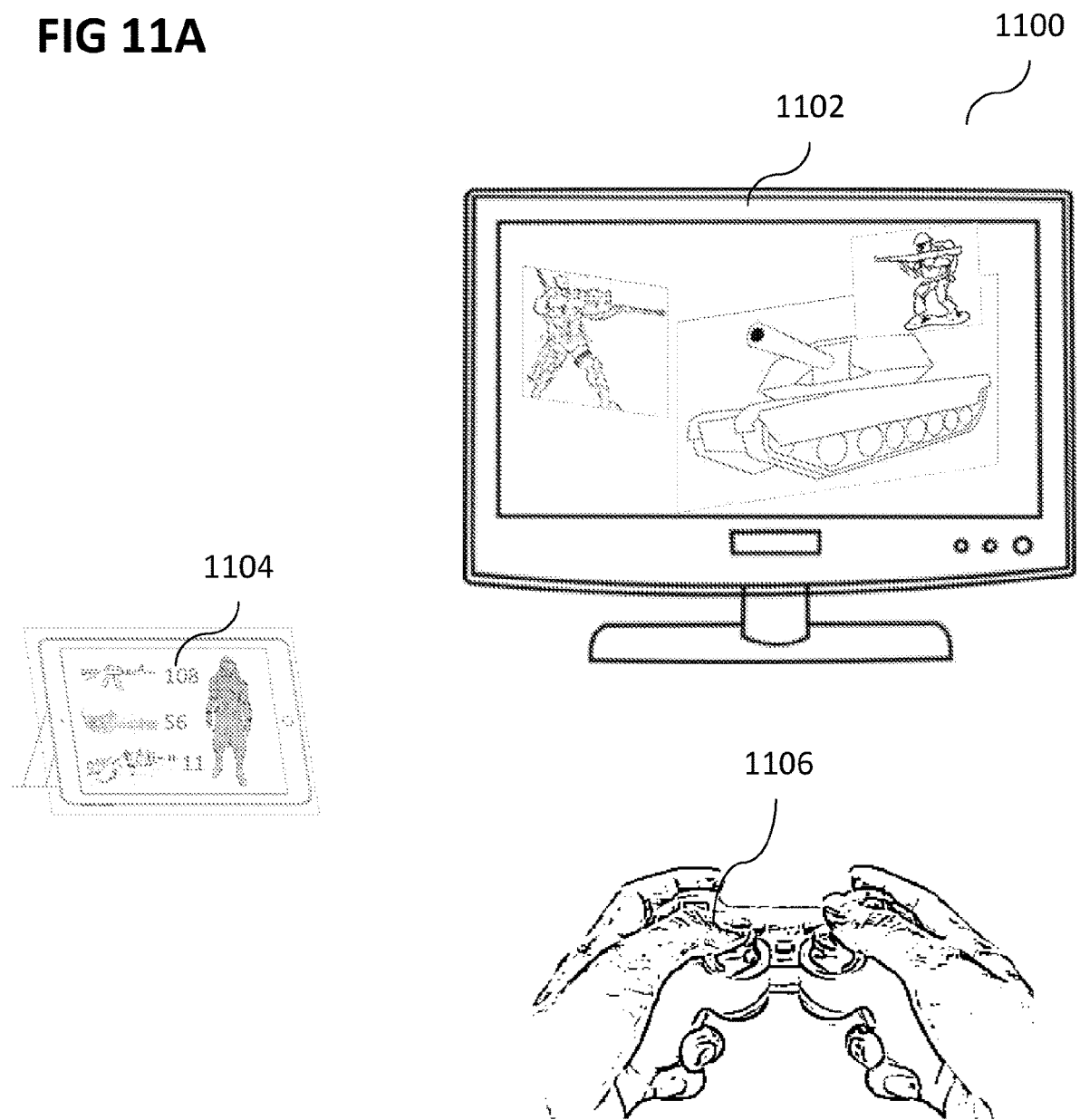
FIG. 11A shows an illustration of an application scenario according to various embodiments.

FIG. 11A shows an illustration 1100 of an application scenario according to various embodiments. A user, for example a gamer A, may play a video game on his console (wherein an output of the video game is shown on a display 1102, for example a computer screen or a TV (television)), for example using an input device 1106, for example a game pad. A companion app (which may for example use a tablet for its output) may be paired and in-sync with the console gameplay. The companion app may be by the user's side, so that the user can see the output of the companion app while playing the video game.

Figure 11B:
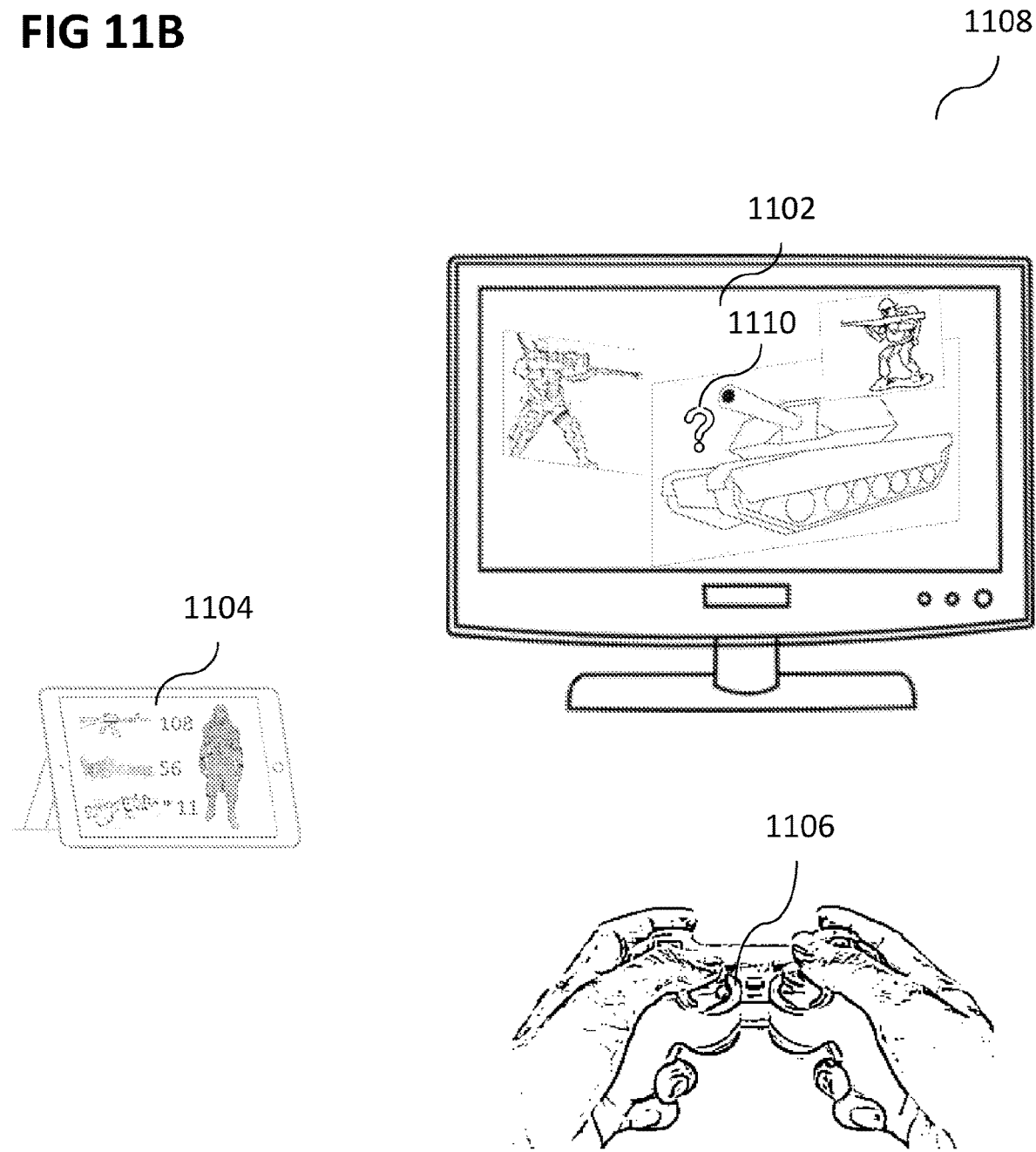
FIG. 11B shows a further illustration of the application scenario of FIG. 11A according to various embodiments.

FIG. 11B shows a further illustration 1108 of the application scenario of FIG. 11A according to various embodiments. The gamer may try to destroy an enemy vehicle. After several unsuccessful attempts, a gamer may see a visual hint (for example in the form of a question mark 1110) notifying user that help topic is available. The user may seek help through hints. A help notification feature may be provided as a part of an SDK (software development kit) that game developers may use in programming their games. When the gamer is having difficulty in a game, the SDK allows the game system to be smart to display hints option.

Figure 12:
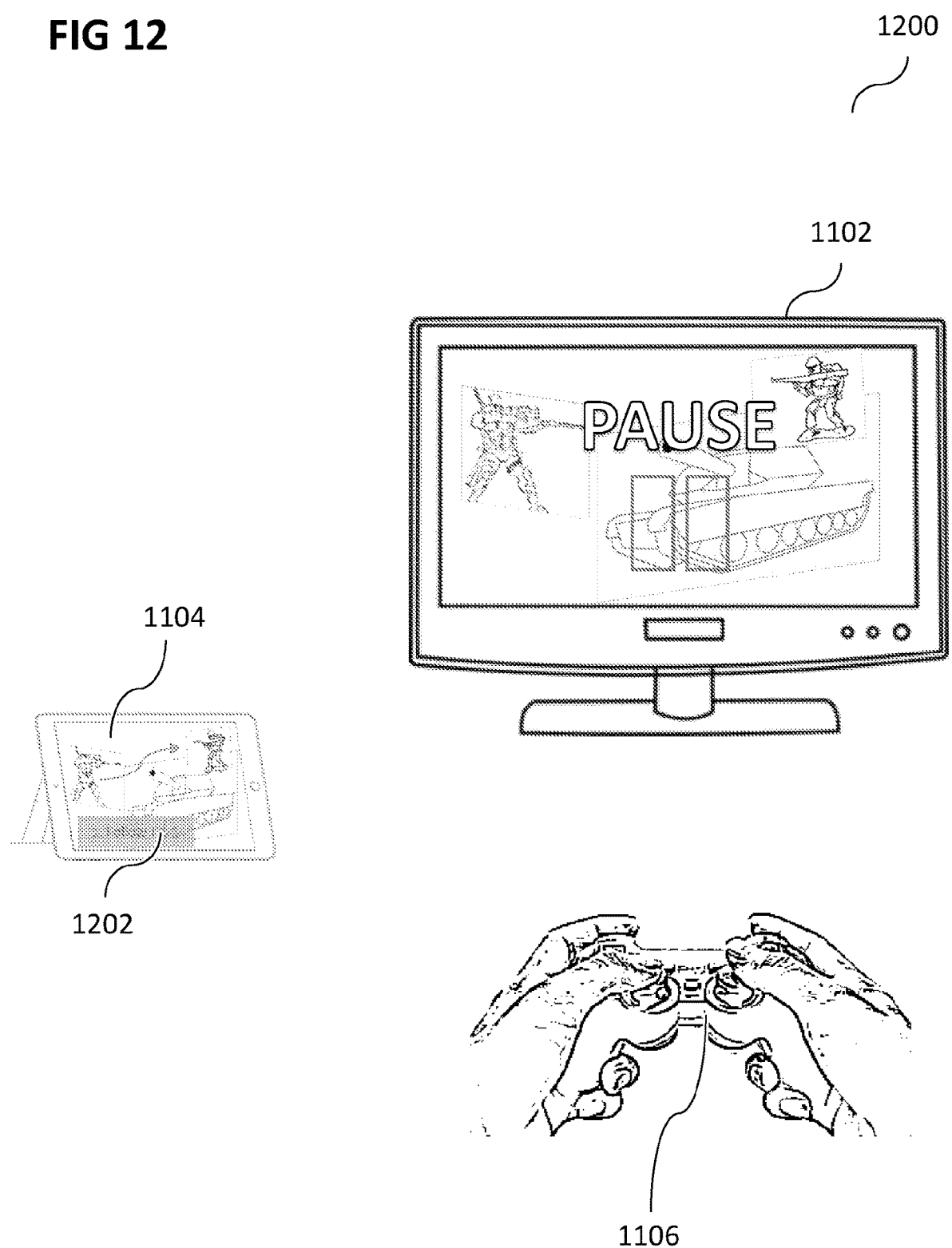
FIG. 12 shows an illustration of a method of getting a hint according to various embodiments.

FIG. 12 shows an illustration 1200 of a method of getting a hint according to various embodiments. The companion app may be in-sync with the console gameplay, and as such, the user may get help material (for example text, video, and/or instructions) via the companion app, like indicated by 1202 (wherein a textual hint to perform certain action is displayed). While seeking help, the gameplay on the console may pause to let the gamer consume help content via the companion app (for example on his mobile device, for example tablet).

Figure 13:
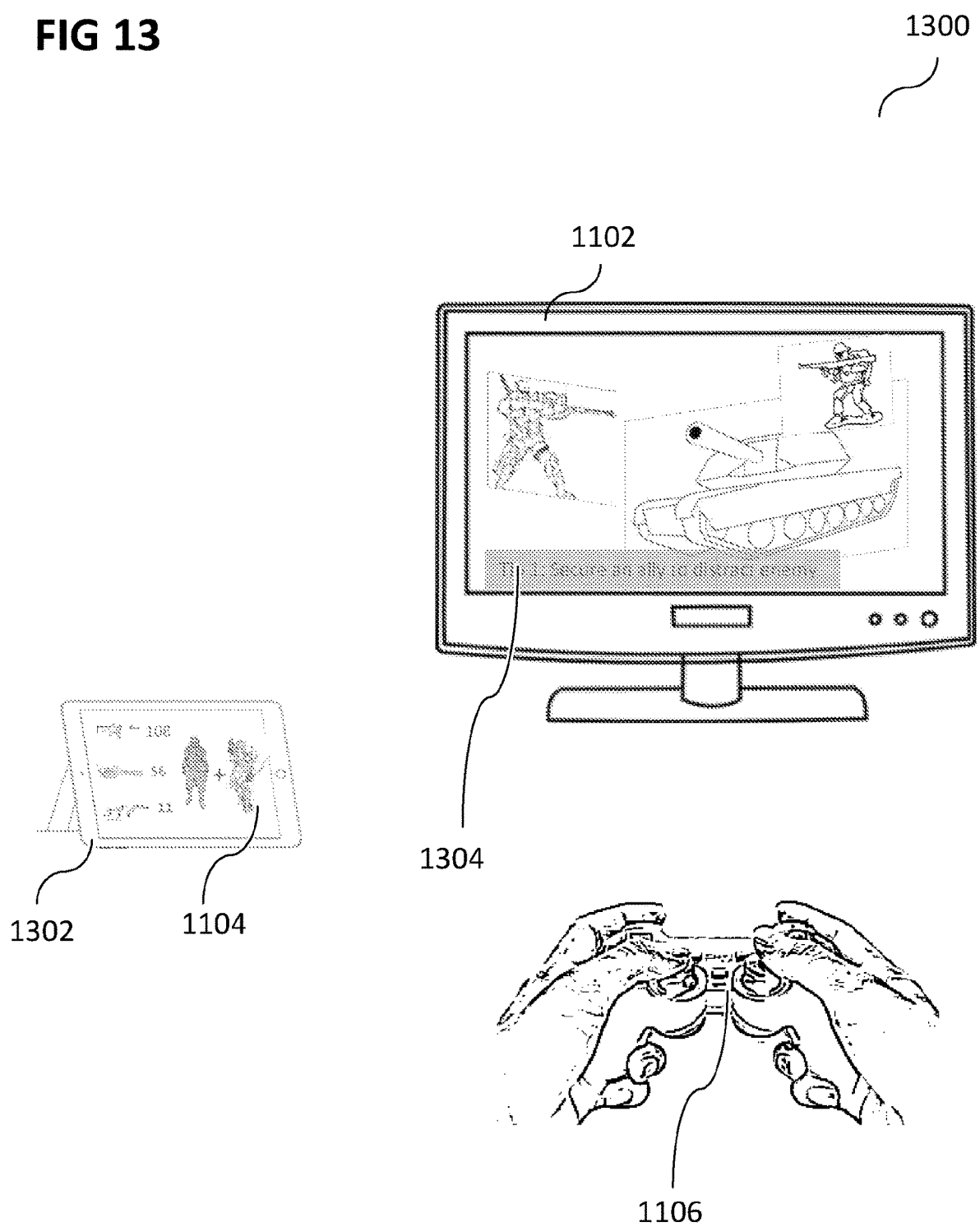
FIG. 13 shows an illustration of a method of getting a hint according to various embodiments.

FIG. 13 shows an illustration 1300 of a method of getting a hint according to various embodiments. The gamer may consume help topics directly on the display 1102 of his game console (for example TV console) in the form of a translucent overlay 1304, while the console gameplay may not pause. The mobile companion app may continue to display additional helpful information 1302 via the tablet 1104.

After consuming help content (for example like described with reference to FIG. 12 or like described with reference to FIG. 13), a gamer may be able to destroy enemy vehicle and make progress in his game.

If a gamer learns new ways to destroy enemy, he may contribute to the gaming community.

Figure 14:
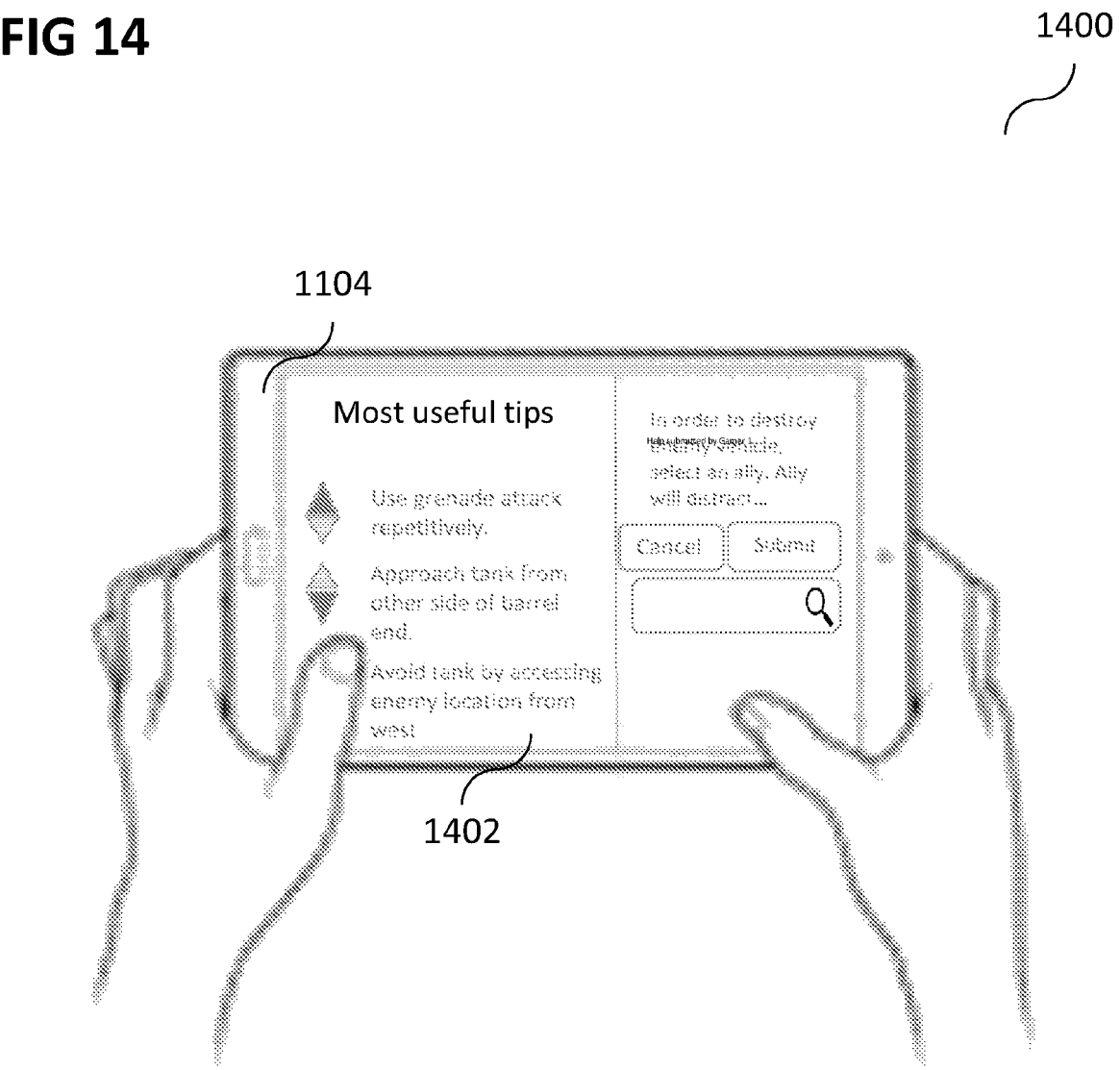
FIG. 14 shows an illustration of contributing to a gaming community according to various embodiments.

FIG. 14 shows an illustration 1400 of contributing to a gaming community according to various embodiments. After learning new ways to complete a challenge, the gamer may launch an online portal or smartphone companion app 1402, for example on his mobile device or tablet 1104. The user may submit his technique and lessons on the portal, and share it with fellow gamers. According to various embodiments, a user interface of the companion app 1402 may provide an interface for a user inputting specific information, such as: challenge resolved, helpful tips/comments/video, skill level required, tools/weapons/items need to be owned, or any other information that may be critical to resolving challenge in game.

The gamer community may vote for new techniques of overcoming a challenge. When new gamers discover this content being stuck at similar point in gameplay, they may receive this new content as in-game overlay, depending on how many up-votes it has received.

If now another gamer B plays the same video game on his console with his companion app paired and in-sync with console gameplay, and gamer B has similar unsuccessful attempts in destroying enemy vehicle, gamer B may see the same visual hint (as seen by gamer A) notifying user that help is available. The second user may seek help through hints. Like will be described below with reference to FIG. 15, the help (or hint) provided by gamer A (assuming that suggestions of first gamer received most upvotes for same stage help) may now show up. All gamers who are stuck at same level may see the same help, until another gamer posts his findings (or hints), and those findings receive most upvotes.

Figure 15:
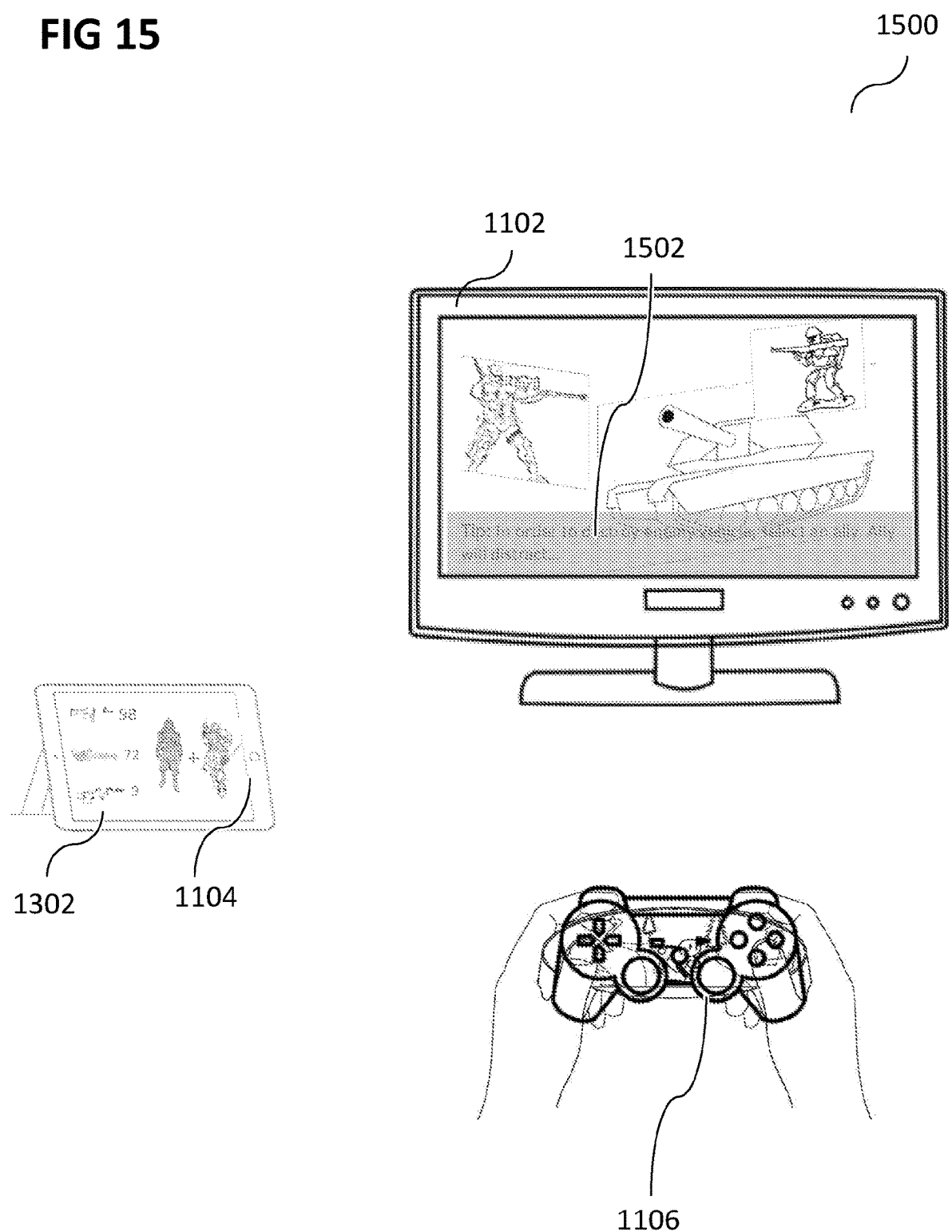
FIG. 15 shows an illustration of receiving a hint provided by the first gamer according to various embodiments.

FIG. 15 shows an illustration 1500 of receiving a hint 1502 provided by gamer A according to various embodiments.

Various embodiments may enable users/gamers to create their own content. Unlike conventional companion app content, where content is pushed uni-directionally (from studios/game publishers to gamers), the companion app according to various embodiments may provide a bi-directional content flow, where gamers may be able to create their own content and share on Razer's platform for consumption by other gamers.

Various embodiments may provide gamer generated content, and share it with gamers real-time within games, for example as in-game overlay. This content may be likely to change when context remains same, depending on feedback from the gamer community.

According to various embodiments, customized content may be provided which may show up in-game, for example as an overlay, or on a separate mobile communication device (for example a tablet) using a companion app.

With various embodiments, gamers may create content (such as hints, tips, suggestions and other textual content) pertaining to a game or challenge within a game. This content may also be image or video based.

Various embodiments may be considered as a Wikipedia for games, where gamers create their own content, which may be provided as an in-game overlay.

Various embodiments may allow gamers to use their mobile devices for creating content that will then show up in-game as an overlay.

According to various embodiments, a server may be provided which may act as a messenger to share most popular help tips, match making, recommendations and other features.

In various embodiments, users may create their own content, which may be shared via a companion platform on the base platform (for example on the console).

According to various embodiments, content created by gamers may be displayed "in-game" as a game overlay via an SDK.

According to various embodiments, a companion platform as a content creation platform may be provided. When companion platform creates content, it may be pushed to an experience server, from where it may be pushed to game consoles, thereby being consumed by other gamers either on their console or their companion devices.

According to various embodiments, content may be generated by gamers, and shared across the platform for consumption by other gamers.

Various embodiments may provide a platform for gamers to create their own content which may be shared, consumed and edited by gaming community. This content will be embedded in-game as an overlay by using an SDK.

According to various embodiments, companion devices may interact with consoles. According to various embodiments, content may be created, enhanced and shared with the community.

The following examples pertain to further embodiments.

Example A1 is a data providing method comprising: determining a hypothetical question of a user using an application program; determining an answer to the hypothetical question; and providing the answer in the form of a hint to the user.

In example A2, the subject-matter of example A1 can optionally include: storing history information of at least one further database; and determining the hypothetical question based on the historical information.

In example A3, the subject-matter of any one of examples A1 to A2 can optionally include: storing application information about the application program used by the user; and determining the hypothetical question based on the application information.

In example A4, the subject-matter of any one of examples A1 to A3 can optionally include: storing profile information of the user; and determining the hypothetical question based on the profile information.

In example A5, the subject-matter of any one of examples A1 to A4 can optionally include: storing real-time information of at least one of the application program used by the user or of a system used by the user for executing the application program; and determining the hypothetical question based on the real-time information.

In example A6, the subject-matter of any one of examples A1 to A5 can optionally include: providing the hint to the user using at least one of audio information, visual information, text information, vibration information, pressure information, and heat information.

In example A7, the subject-matter of any one of examples A1 to A6 can optionally include: receiving a question from the user; determining an answer to the receive question; and providing the answer to the user.

In example A8, the subject-matter of example A7 can optionally include receiving the question from the user using at least one of audio information, visual information, text information, gestures information, button depression information, neural information, movement information, biosensor information, touch information, smell information, or taste information.

In example A9, the subject-matter of any one of examples A7 to A8 can optionally include providing the answer to the user using at least one of audio information, visual information, text information, vibration information, pressure information, and heat information.

In example A10, the subject-matter of any one of examples A1 to A9 can optionally include that the application program comprises a computer game.

Example A11 is a data providing system comprising: a question determination circuit configured to determine a hypothetical question of a user using an application program; an answer determination circuit configured to determine an answer to the hypothetical question; and a pre-emptive monitor circuit configured to provide the answer in the form of a hint to the user.

In example A12, the subject-matter of example A11 can optionally include: a historical database configured to store history information of at least one further database; wherein the question determination circuit configured to determine the hypothetical question based on the historical information.

In example A13, the subject-matter of any one of examples A11 to A12 can optionally include: an application information database configured to store application information about the application program used by the user; wherein the question determination circuit configured to determine the hypothetical question based on the application information.

In example A14, the subject-matter of any one of examples A11 to A13 can optionally include: a user profile memory configured to store profile information of the user; wherein the question determination circuit configured to determine the hypothetical question based on the profile information.

In example A15, the subject-matter of any one of examples A11 to A14 can optionally include: a real-time data memory configured to store real-time information of at least one of the application program used by the user or of a system used by the user for executing the application program; wherein the question determination circuit configured to determine the hypothetical question based on the real-time information.

In example A16, the subject-matter of any one of examples A11 to A15 can optionally include that the pre-emptive monitor circuit is configured to provide the hint to the user using at least one of audio information, visual information, text information, vibration information, pressure information, and heat information.

In example A17, the subject-matter of any one of examples A11 to A16 can optionally include: a question input circuit configured to receive a question from the user, wherein the answer determination circuit is configured to determine an answer to the receive question; and an answer providing circuit configured to provide the answer to the user.

In example A18, the subject-matter of example A17 can optionally include that the question input circuit is configured to receive the question from the user using at least one of audio information, visual information, text information, gestures information, button depression information, neural information, movement information, biosensor information, touch information, smell information, or taste information.

In example A19, the subject-matter of any one of examples A17 to A18 can optionally include that the answer providing circuit is configured to provide the answer to the user using at least one of audio information, visual information, text information, vibration information, pressure information, and heat information.

In example A20, the subject-matter of any one of examples A11 to A19 can optionally include that the application program comprises a computer game.

Example A21 is a computer-readable medium comprising instructions which, when executed by a computer, make the computer perform a data providing method, the data providing method comprising: determining a hypothetical question of a user using an application program; determining an answer to the hypothetical question; and providing the answer in the form of a hint to the user.

In example A22, the subject-matter of example A21 can optionally include instructions which, when executed by a computer, make the computer perform: storing history information of at least one further database; and determining the hypothetical question based on the historical information.

In example A23, the subject-matter of any one of examples A21 to A22 can optionally include instructions which, when executed by a computer, make the computer perform: storing application information about the application program used by the user; and determining the hypothetical question based on the application information.

In example A24, the subject-matter of any one of examples A21 to A23 can optionally include instructions which, when executed by a computer, make the computer perform: storing profile information of the user; and determining the hypothetical question based on the profile information.

In example A25, the subject-matter of any one of examples A21 to A24 can optionally include instructions which, when executed by a computer, make the computer perform: storing real-time information of at least one of the application program used by the user or of a system used by the user for executing the application program; and determining the hypothetical question based on the real-time information.

In example A26, the subject-matter of any one of examples A21 to A25 can optionally include instructions which, when executed by a computer, make the computer perform: providing the hint to the user using at least one of audio information, visual information, text information, vibration information, pressure information, and heat information.

In example A27, the subject-matter of any one of examples A21 to A26 can optionally include instructions which, when executed by a computer, make the computer perform: receiving a question from the user; determining an answer to the receive question; and providing the answer to the user.

In example A28, the subject-matter of example A27 can optionally include instructions which, when executed by a computer, make the computer perform: receiving the question from the user using at least one of audio information, visual information, text information, gestures information, button depression information, neural information, movement information, biosensor information, touch information, smell information, or taste information.

In example A29, the subject-matter of any one of examples A27 to A28 can optionally include instructions which, when executed by a computer, make the computer perform: providing the answer to the user using at least one of audio information, visual information, text information, vibration information, pressure information, and heat information.

In example A30, the subject-matter of any one of examples A21 to A29 can optionally include that the application program comprises a computer game.

Example B1 is a communication method comprising: generating a hint on solving a situation in an electronic game; and transmitting the hint to a server configured to provide the hint to gamers playing the electronic game.

In example B2, the subject-matter of example B1 can optionally include that the hint comprises at least one of textual information, audio information, or video information.

In example B3, the subject-matter of any one of examples B1 to B2 can optionally include that the hint is generated on a companion device configured to display a further hint.

In example B4, the subject-matter of example B3 can optionally include transmitting a vote for the further hint.

Example B5 is a communication method comprising: receiving a hint on solving a situation in an electronic game; storing the hint on a server; and providing the hint to gamers playing the electronic game.

In example B6, the subject-matter of example B5 can optionally include that the hints comprise at least one of textual information, audio information, or video information.

In example B7, the subject-matter of any one of examples B5 to B6 can optionally include storing a plurality of hints for a same situation on the server.

In example B8, the subject-matter of example B7 can optionally include receiving a vote for at least one hint of the plurality of hints.

In example B9, the subject-matter of example B8 can optionally include that a hint of the plurality of hints with a highest number of votes among the plurality of hints is provided to the gamers.

In example B10, the subject-matter of any one of examples B5 to B9 can optionally include that the hint is provided as at least one of an overlay to the electronic game or as a notification in a companion app.

Example B11 is a computer-readable medium comprising instructions which, when executed by a computer, make the computer perform a communication method, the communication method comprising: generating a hint on solving a situation in an electronic game; and transmitting the hint to a server configured to provide the hint to gamers playing the electronic game.

In example B12, the subject-matter of example B11 can optionally include that the hint comprises at least one of textual information, audio information, or video information.

In example B13, the subject-matter of any one of examples B11 to B12 can optionally include that the hint is generated on a companion device configured to display a further hint.

In example B14, the subject-matter of example B13 can optionally include instructions which, when executed by a computer, make the computer perform: transmitting a vote for the further hint.

Example B15 is a computer-readable medium comprising instructions which, when executed by a computer, make the computer perform a communication method, the communication method comprising: receiving a hint on solving a situation in an electronic game; storing the hint on a server; and providing the hint to gamers playing the electronic game.

In example B16, the subject-matter of example B15 can optionally include that the hints comprise at least one of textual information, audio information, or video information.

In example B17, the subject-matter of any one of examples B15 to B16 can optionally include instructions which, when executed by a computer, make the computer perform: storing a plurality of hints for a same situation on the server.

In example B18, the subject-matter of example B17 can optionally include instructions which, when executed by a computer, make the computer perform: receiving a vote for at least one hint of the plurality of hints.

In example B19, the subject-matter of example B18 can optionally include that a hint of the plurality of hints with a highest number of votes among the plurality of hints is provided to the gamers.

In example B20, the subject-matter of any one of examples B15 to B19 can optionally include that the hint is provided as at least one of an overlay to the electronic game or as a notification in a companion app.

Example B21 is a communication device comprising: a hint generation circuit configured to generate a hint on solving a situation in an electronic game; and a transmitter configured to transmit the hint to a server configured to provide the hint to gamers playing the electronic game.

In example B22, the subject-matter of examples B21 can optionally include that the hint comprises at least one of textual information, audio information, or video information.

In example B23, the subject-matter of any one of examples B21 to B22 can optionally include that the hint is generated on a companion device configured to display a further hint.

In example B24, the subject-matter of example B23 can optionally include that the transmitter is further configured to transmit a vote for the further hint.

Example B25 is a server comprising: a receiver configured to receive a hint on solving a situation in an electronic game; a storage configured to store the hint; and a transmitter configured to provide the hint to gamers playing the electronic game.

In example B26, the subject-matter of example B25 can optionally include that the hints comprise at least one of textual information, audio information, or video information.

In example B27, the subject-matter of any one of examples B25 to B26 can optionally include that the storage is further configured to store a plurality of hints for a same situation.

In example B28, the subject-matter of example B27 can optionally include that the receiver is further configured to receive a vote for at least one hint of the plurality of hints.

In example B29, the subject-matter of example B28 can optionally include that the transmitter is configured to provide a hint of the plurality of hints with a highest number of votes among the plurality of hints to the gainers.

In example B30, the subject-matter of any one of examples B25 to B29 can optionally include that the transmitter is configured to provide the hint as at least one of an overlay to the electronic game or as a notification in a companion app.

In a further example, any one or more of examples A1 to A30 and/or B1 to B30 may be combined.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method for facilitating game play comprising:
providing an artificial intelligence game mentor comprising a user interface, a pre-emptive monitor, and a question and answer engine;
collecting data, by the pre-emptive monitor, from different sources relating to a game program;
continuously monitoring and analyzing situations in the game program using the pre-emptive monitor;
providing inputs through the user interface to the question and answer engine, wherein the inputs comprise audio information, visual information, text information, gestures information, button depression information, neural information, movement information, biosensor information, touch information, smell information, or taste information,
wherein the input further comprises multiple inputs combined into a single input by the question and answer engine;
determining, by the pre-emptive monitor, a game play question from the collected data and the continuously analyzed situations in the game and whether to present the game play question to the question and answer engine, wherein the game play question relates to a particular situation in the game program;
determining an answer to the game play question based on the collected data, wherein the answer determination is a cyclic process to enable continuous learning and improvement by the artificial intelligence game mentor; and
providing the answer comprising one or more hints or guides to the user through the user interface as an overlay to augment the game play using at least one of audio information, visual information, text information, vibration information, pressure information, and heat information provided by an output compositor, and the answer further comprises pre-emptive assistance to the user during the game play; and
having the artificial intelligence game mentor act as a real-time virtual coach for the user.

2. The method of claim 1, further comprising:
storing history information of at least one further database; and
determining the game play question based on the historical information.

3. The method of claim 1, further comprising:
storing game information about the game program used by the user; and
determining the game play question based on the game information.

4. The method of claim 1, further comprising:
storing profile information of the user; and
determining the game play question based on the profile information.

5. The method of claim 1, further comprising:
storing real-time information for the game program used by the user or of a system used by the user for executing the game program; and
determining the game play question based on the real-time information.

6. The method of claim 1, further comprising:
the game play question being a specific question received from the user;
determining a specific answer to the received specific question; and
providing the specific answer to the user, wherein the system acts as the virtual coach providing the specific answer through the user interface.

7. The method of claim 1, further comprising:
storing the hints on a server and transmitting the hint from the server to the user playing the game program.

8. The method of claim 1, further comprising:
the question and answer engine receiving in multiple formats and give replies in multiple formats.

9. The method of claim 1, wherein the cyclic process further comprises the artificial intelligence game mentor recording and examining its past answers and responses from the user.

10. An artificial intelligence game mentor for facilitating game play comprising:
a database populated with data collected from different sources relating to a game program;
a question and answer engine processing questions and answers, wherein the question and answer engine receives inputs through a user interface, the inputs comprising audio information, visual information, text information, gestures information, button depression information, neural information, movement information, biosensor information, touch information, smell information, and taste information, wherein the inputs further comprises multiple inputs combined into a single input by the question and answer engine;
a question determination circuit configured to determine a game play question from the collected data, the continuously analyzed situations in the game and the inputs provided to the question and answer engine, wherein the game play question relates to a situation in the game program;
an answer determination circuit configured to determine an answer to the game play question, wherein the answer determination is a cyclic process to enable continuous learning and improvement by the artificial intelligence game mentor; and
a pre-emptive monitor circuit configured to collect the data and continuously monitor and analyzing situations in the game program and determine whether to present the game play question to the question and answer engine;
the answer comprising one or more hints or guides to the user through the user interface as an overlay to augment the game play using at least one of audio information, visual information, text information, vibration information, pressure information, and heat information provided by an output compositor, wherein the answer further comprises pre-emptive assistance to the user during the game play; and
the artificial intelligence game mentor providing real-time virtual coaching to facilitate the game play for the user.

11. The system of claim 10, further comprising:
a historical database configured to store history information of at least one further database;
wherein the question determination circuit configured to determine the game play question based on the historical information.

12. The system of claim 10, further comprising:
an game information database configured to store game information about the game program used by the user;
wherein the question determination circuit configured to determine the game play question based on the game information.

13. The system of claim 10, further comprising:
a user profile memory configured to store profile information of the user;
wherein the question determination circuit configured to determine the game play question based on the profile information.

14. The system of claim 10, further comprising:
a real-time data memory configured to store real-time information for the game program used by the user or of a system used by the user for executing the game program;
wherein the question determination circuit configured to determine the game play question based on the real-time information.

15. The system of claim 10, further comprising:
a question input circuit configured to receive a specific question from the user, wherein the answer determination circuit is configured to determine a specific answer to the received specific question; and
an answer providing circuit configured to provide the specific answer to the user, wherein the system acts as the virtual coach providing the specific answer through the user interface.

16. The system of claim 15,
wherein the answer providing circuit is configured to provide the specific answer to the user using at least one of audio information, visual information, text information, vibration information, pressure information, and heat information.

17. The artificial intelligence game mentor of claim 10, further comprising:
a server for storing the hint, wherein the server comprises a transmitter for transmitting the hint to the user playing the game program.

18. The artificial intelligence game mentor of claim 10, further comprising:
the question and answer engine receiving queries in multiple formats and providing replies in multiple formats.

19. The artificial intelligence game mentor of claim 10, wherein the cyclic process further comprises the artificial intelligence game mentor recording and examining its past answers and responses from the user.

20. A non-transitory computer-readable storage medium providing instructions for execution by a computer to perform a method for facilitating game play, the method comprising:
providing an artificial intelligence game mentor comprising a user interface, a pre-emptive monitor, and a question and answer engine;
collecting data, by the pre-emptive monitor, from different sources relating to a game program;
continuously monitoring and analyzing situations in the game program using the pre-emptive monitor;
providing inputs through the user interface to the question and answer engine, wherein the inputs comprise audio information, visual information, text information, gestures information, button depression information, neural information, movement information, biosensor information, touch information, smell information, or taste information provided by an output compositor;
wherein the input further comprises multiple inputs combined into a single input by the question and answer engine;
determining, by the pre-emptive monitor, a game play question from the collected data, the continuously analyzed situations in the game and whether to present the game play question to the question and answer engine, wherein the game play question relates to a particular situation in the game program;
determining an answer to the game play question based on the collected data, wherein the answer determination is a cyclic process to enable continuous learning and improvement by the artificial intelligence game mentor; and
providing the answer comprising one or more hints or guides to the user through the user interface as an overlay to augment the game play using at least one of audio information, visual information, text information, vibration information, pressure information, and heat information provided by an output compositor, wherein the answer further comprises pre-emptive assistance to the user during the game play; and;
the artificial intelligence game mentor acting as a real-time virtual coach for the user.

* * * * *